US009538852B2

(12) United States Patent
Levy et al.

(10) Patent No.: US 9,538,852 B2
(45) Date of Patent: Jan. 10, 2017

(54) STABILIZING APPARATUS FOR INCLINED LEGS

(76) Inventors: Ofer Levy, Rehovot (IL); Uri Wolf, Ganey Tikva (IL)

( * ) Notice: Subject to any disclaimer, the term of this patent is extended or adjusted under 35 U.S.C. 154(b) by 0 days.

(21) Appl. No.: 14/110,037

(22) PCT Filed: Apr. 2, 2012

(86) PCT No.: PCT/IL2012/000146
§ 371 (c)(1),
(2), (4) Date: Nov. 6, 2013

(87) PCT Pub. No.: WO2012/137196
PCT Pub. Date: Oct. 11, 2012

(65) Prior Publication Data
US 2014/0289967 A1    Oct. 2, 2014

(30) Foreign Application Priority Data

Apr. 7, 2011 (IL) .......................... 212210

(51) Int. Cl.
*A47C 20/00*   (2006.01)
*A47B 23/00*   (2006.01)
(Continued)

(52) U.S. Cl.
CPC ........... *A47C 20/022* (2013.01); *A47B 23/002* (2013.01); *F16M 13/00* (2013.01); *F16M 13/04* (2013.01); *A45C 2011/003* (2013.01)

(58) Field of Classification Search
CPC ..... A63B 21/055; A63B 21/023; A61F 5/028; A47C 20/022; A47B 23/002; A45C 2011/003
(Continued)

(56) References Cited

U.S. PATENT DOCUMENTS 615,480 A     12/1898 Englund
1,593,166 A *  7/1926 Flach ........................... 248/444
(Continued)

OTHER PUBLICATIONS

International Search Report for Application No. PCT/IL2012/000146 dated Aug. 16, 2012.
(Continued)

*Primary Examiner* — Robert G Santos
*Assistant Examiner* — Myles Throop
(74) *Attorney, Agent, or Firm* — Alston & Bird LLP

(57) ABSTRACT

Stabilizing apparatus for inclined legs comprises a thigh engageable portion extending generally transversally along the width of the lap of a subject with which the apparatus is bodily engaged, two spaced appendage portions extending downwardly from the thigh engageable portion, a foot engageable portion positionable on an underlying surface, and a portion, such a connecting element and tensioning device, extending from each of the two appendage portions to a foot engageable portion. The two appendage portions are positionable to be substantially in contact with the lateral side of a thigh of the subject. A loop is defined such that each of the portions extending from an appendage portion to a foot engageable portion is suitably tensioned so as to apply forces to a foot engageable portion for resisting a forward foot sliding motion and to an appendage portion for resisting relative transversal motion of an inclined leg.

27 Claims, 24 Drawing Sheets

(51) Int. Cl.
*F16M 13/00* (2006.01)
*F16M 13/04* (2006.01)
*A45C 11/00* (2006.01)

(58) Field of Classification Search
USPC ............. 5/655; 482/125, 131, 133, 907
See application file for complete search history.

(56) References Cited

U.S. PATENT DOCUMENTS

| | | | |
|---|---|---|---|
| 2,335,290 A * | 11/1943 | Medaris | 601/33 |
| 4,252,112 A | 2/1981 | Joyce | |
| 4,264,049 A * | 4/1981 | Daniels | 248/444 |
| 4,735,412 A * | 4/1988 | Prsala | A63B 21/055 |
| | | | 482/125 |
| 4,765,005 A | 8/1988 | Hippel | |
| 4,940,066 A * | 7/1990 | Santilli et al. | 128/882 |
| 5,127,339 A | 7/1992 | Hood, Jr. | |
| 5,207,627 A | 5/1993 | Doran | |
| 5,471,767 A | 12/1995 | Walker | |
| 5,607,091 A | 3/1997 | Musacchia | |
| 5,643,184 A * | 7/1997 | Toso | 602/19 |
| 5,674,163 A * | 10/1997 | Sennett | 482/125 |
| 5,690,309 A | 11/1997 | Blum | |
| 5,762,250 A | 6/1998 | Carlton et al. | |
| 5,791,000 A | 8/1998 | Noyes | |
| 5,823,574 A * | 10/1998 | Sullins et al. | 281/45 |
| 5,839,999 A * | 11/1998 | Pflugner | 482/140 |
| 5,846,170 A * | 12/1998 | Ho | 482/125 |
| 6,083,183 A * | 7/2000 | Yang | 602/19 |
| 6,202,236 B1 * | 3/2001 | Price | 5/657 |
| 6,270,050 B1 * | 8/2001 | Friedrich | 248/444 |
| 6,361,516 B1 * | 3/2002 | Hamel | 602/27 |
| 6,384,810 B1 | 5/2002 | Selker | |
| 2002/0023301 A1 | 2/2002 | Vuuren | |
| 2007/0221696 A1 | 9/2007 | Kakita | |
| 2009/0229497 A1 * | 9/2009 | Persico et al. | 108/43 |
| 2012/0097831 A1 * | 4/2012 | Olukotun et al. | 248/688 |
| 2015/0076877 A1 * | 3/2015 | Ferraro | B60N 2/2812 |
| | | | 297/250.1 |

OTHER PUBLICATIONS

International Preliminary Report on Patentability for Application No. PCT/IL2012/000146 dated May 3, 2013.

* cited by examiner

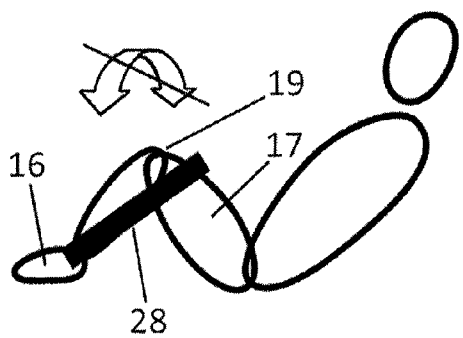
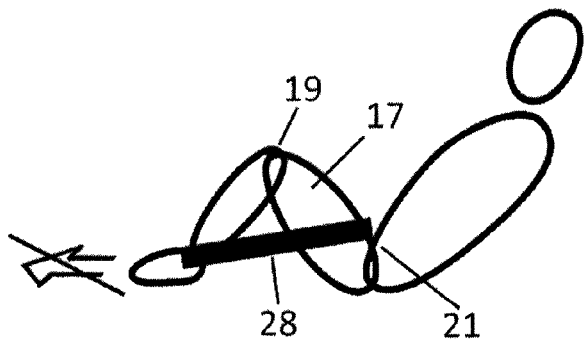
Fig. 3A    Fig. 3B
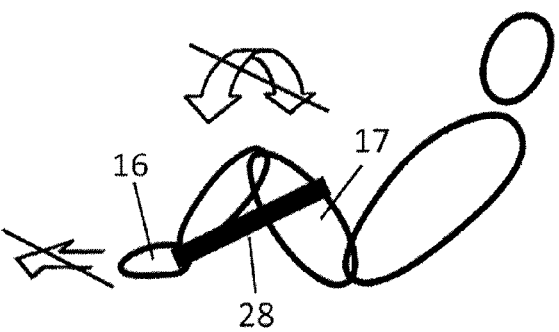
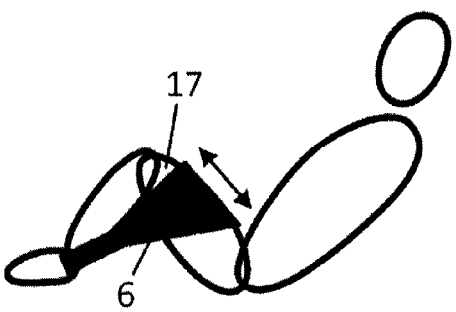
Fig. 3C    Fig. 3D

Fig. 20
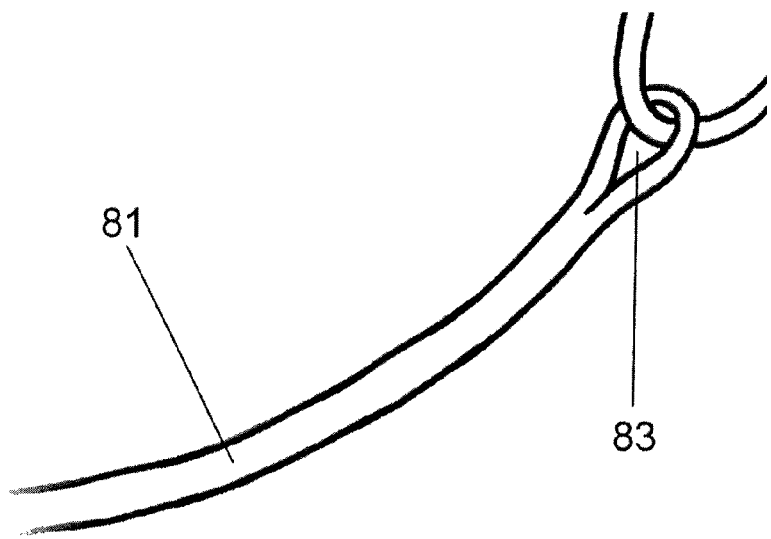
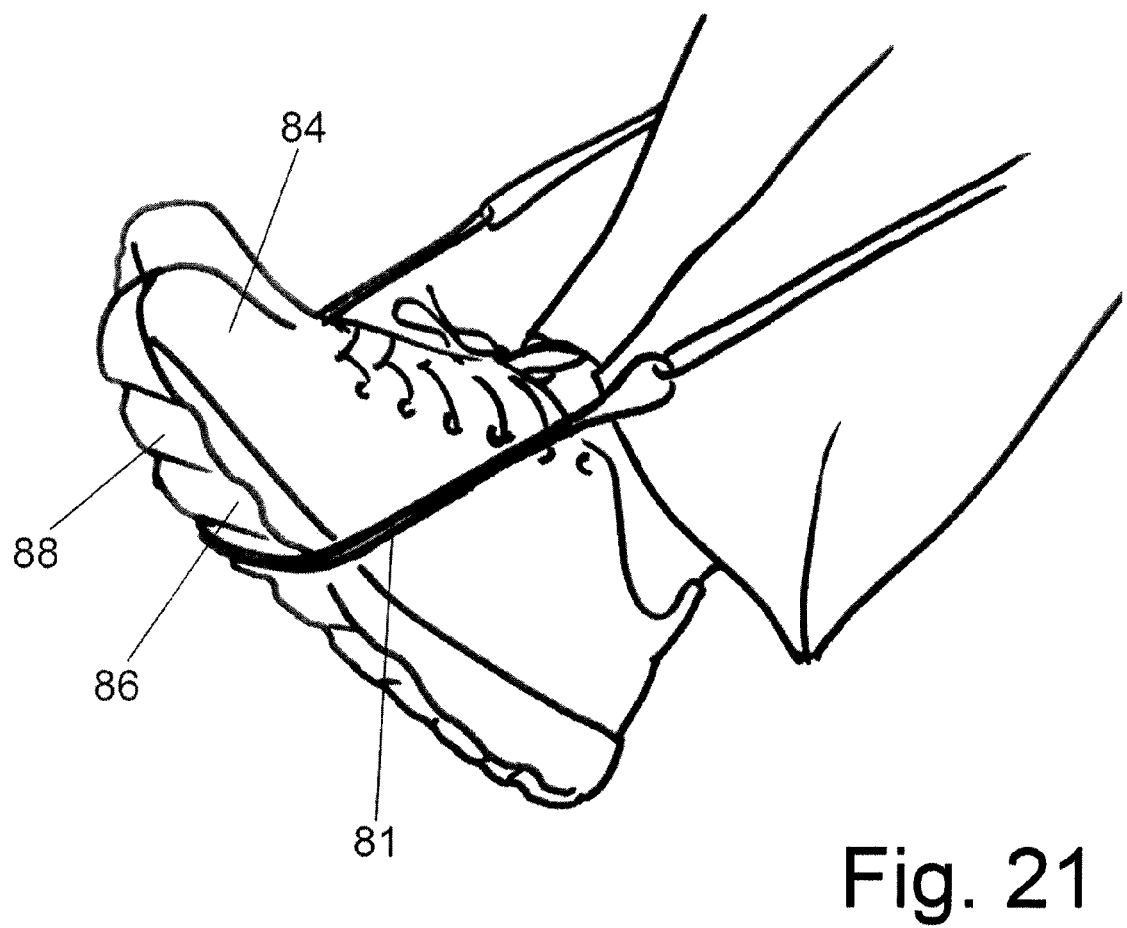
Fig. 21

Fig. 39
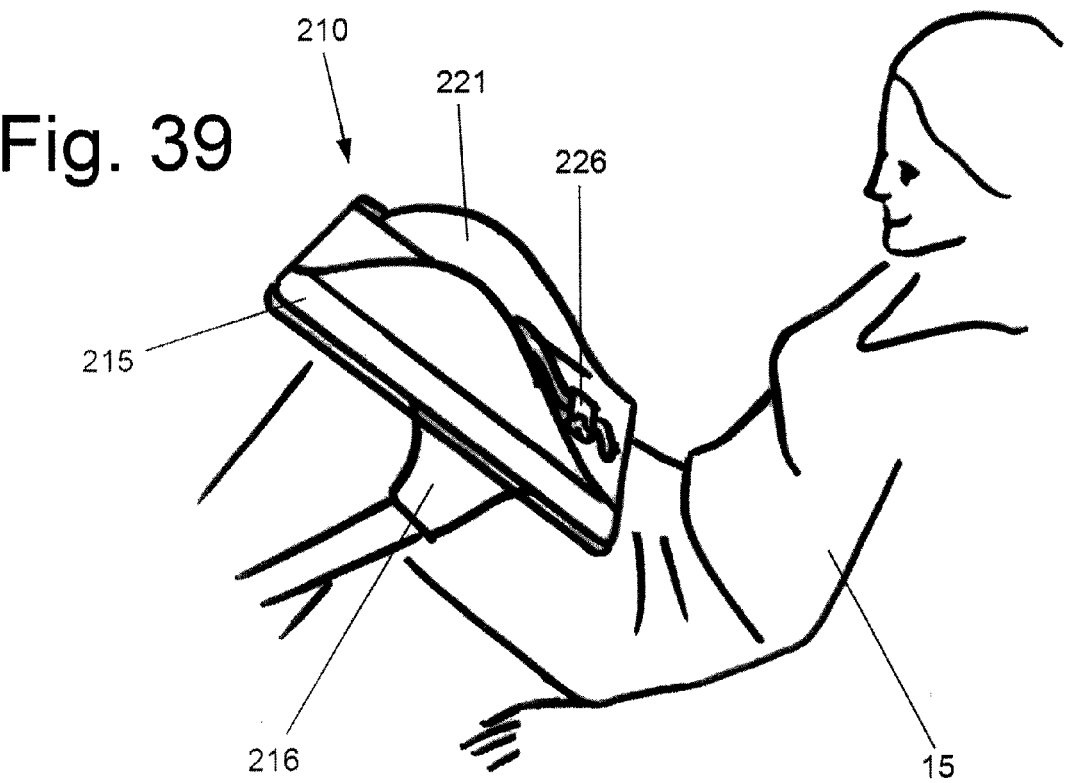
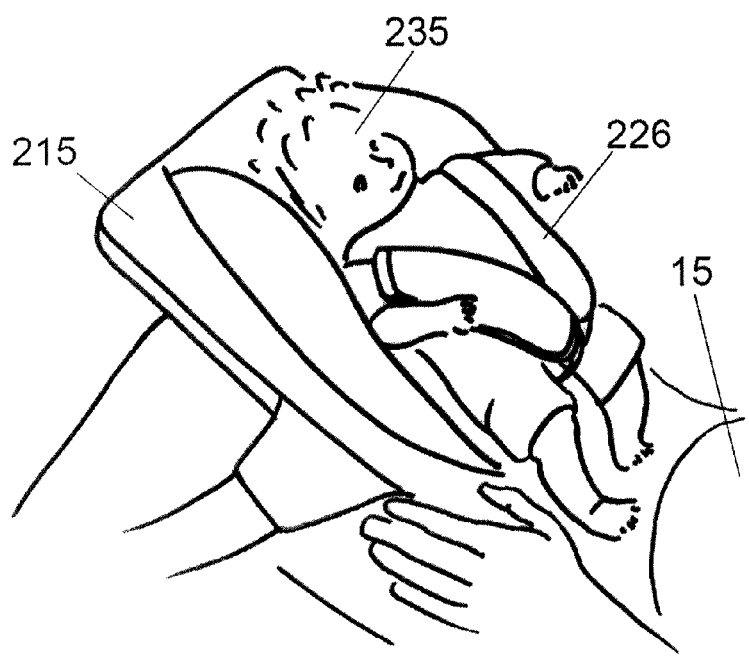
Fig. 40

STABILIZING APPARATUS FOR INCLINED LEGS

FIELD OF THE INVENTION

The present invention relates to the field of body engageable implements. More particularly, the invention relates to an apparatus for stabilizing inclined legs.

BACKGROUND OF THE INVENTION

A supine position whereby one's back contacts an underlying horizontal surface, e.g. a mattress or a floor surface, or a reclined position whereby one's back is at an angle and is supported by cushions is comfortable and provides a relaxing experience, particularly when the legs are in an inclined position. One prefers to be engaged in various activities such as reading and watching television when in a supine or reclined position as a result of the high level of relaxation that these positions afford. An inclined leg position is sufficiently comfortable for the performance of interactive activities with objects placed on one's lap, such as playing with infants placed on the lap or working with a portable computer.

A subject in a supine or reclined position has to make a conscious effort to retain the legs in the inclined position. If not properly exerted, however, the feet tend to slide forwardly, or alternatively, the legs or knees tend to become transversally spaced from each other after an initial inclined leg position. A change from the initial inclined leg position increases the difficulty of performing the aforementioned interactive activities.

The Belkin CushTop Notebook Stand and the Logitech Comfort Lapdesk are padded stands placeable on one's lap for shielding a subject from the heat that a portable computer emits. These stands are usable when the subject is in a sitting position or when the legs are outstretched; however, they are not suitable for portable computer interaction when the legs are in an inclined position since they will slide downwardly.

U.S. Pat. No. 4,264,049 discloses an easel assembly that is self supporting on the artist's body. A first adjustable length strap is adjustably secured at both ends to respective opposite transversal sides of the board toward the rear portion of the drawing board and is adapted to pass around the person's neck or back. A second strap is adjustably attached to and can extend downwardly either from the front portion of the board in order to pass around the person's foot, or it can be partially draped over the top surface of the board and downwardly over the rear edge of the board so that both ends of the strap pass under the person's foot for additional stability. This strap arrangement is cumbersome, and can be used only when a drawing board is employed. Also, this strap arrangement is not adapted to stabilize inclined legs when the subject is in a supine or reclined position.

U.S. Pat. No. 4,765,005 discloses a foot support system including an adjustable elongated foot support for aiding persons in maintaining a sitting position while in bed on a mattress surface or other personal support. This device, however, requires a rope or other attachment device to be positioned around the back of the headboard of a bed.

U.S. Pat. No. 5,791,000 discloses a support device that includes a base attached to two spaced straps with a plurality of adjustable footholds, allowing users to maintain a seated position with their legs drawn up on a support surface without requiring any effort or exertion on the part of the user to retain their legs in this position. The user's weight anchors the base and supports the user's feet and legs. A user, however, will have difficulty in maintaining the thighs during extended periods of time in contact, or in close proximity, with each other in order to continuously perform interactive activities with objects placed on the lap. Also, the base is generally of limited dimensions, and therefore will not be adequately anchored if the user's position is changed from a sitting position to a supine position.

It is an object of the present invention to provide an apparatus for stabilizing the legs in an inclined position irregardless of the disposition of the back or the inclination of the legs.

It is an additional object of the present invention to provide leg stabilizing apparatus that is light, comfortable, and easy to manipulate.

It is an additional object of the present invention to provide leg stabilizing apparatus that does not require attachment to a stationary support element.

It is yet an additional object of the present invention to provide leg stabilizing apparatus that resists a forward foot sliding motion and relative transversal motion of a leg.

Other objects and advantages of the invention will become apparent as the description proceeds.

SUMMARY OF THE INVENTION

The present invention provides stabilizing apparatus for inclined legs, comprising a thigh engageable portion extending generally transversally along the width of the lap of a subject with which said apparatus is bodily engaged; two spaced appendage portions extending downwardly from said thigh engageable portion; a foot engageable portion positionable on an underlying surface; and a portion extending from each of said two appendage portions to a foot engageable portion, wherein each of said two appendage portions is positionable to be in contact with, or slightly spaced from, the lateral side of a thigh of said subject.

Said thigh engageable portion, said foot engageable portion, said two appendage portions, and each of said portions extending from an appendage portion to a foot engageable portion define a loop, wherein each of said portions extending from an appendage portion to a foot engageable portion is suitably tensioned so as to apply forces to a foot engageable portion for resisting a forward foot sliding motion and to an appendage portion for resisting relative transversal motion of an inclined leg.

As referred to herein, the "loop" defined by the stabilizing apparatus is not necessarily continuous, yet provides balanced forces to a foot engageable portion for resisting a forward foot sliding motion and balanced forces to an appendage portion for resisting relative transversal motion of an inclined leg.

Preferably, the thigh engageable portion is positioned on top of a central region of the thighs which is substantially spaced from both the knee and groin, for preventing both a forward foot sliding motion and a relative transversal motion of an inclined leg.

All components of the apparatus are influential in stabilizing the inclined legs. When each of said portions extending from an appendage portion to a foot engageable portion is suitably tensioned, the thigh engageable portion applies a pressure onto the legs to resist movement, the two appendage portions resist relative transversal motion of a corresponding inclined leg, and the foot engageable portion resists a forward foot sliding motion.

In one aspect, the portion extending from the appendage portion to the foot engageable portion is an elongated and flexible connecting element, the apparatus further comprising a tensioning device by which the length of said connecting element between the appendage portion and the foot engageable portion is adjustable, whereby to controllably adjust the tension of the appendage portion.

In one aspect, both feet of the subject are engageable by the foot engageable portion.

In one aspect, the foot engageable portion is a foot engageable member which is provided with two apertures through each of which a corresponding connecting element is feedable.

In one aspect, the thigh engageable portion is a thigh engageable member that is attached at its two transversal ends to two appendages, respectively.

In one aspect, the two appendages are triangular, one end of the connecting element being attached to an apical portion of a corresponding triangular appendage which is not attached to the thigh engageable member.

In one aspect, the two appendages are releasably attached to the thigh engageable member.

In one aspect, the appendage is a strip comprising at one end thereof a hook element, said hook element being releasably engageable with an attachment element having an elongated and narrow cavity which is fastened to a corresponding appendage facing region of the thigh engageable member.

In one aspect, the tensioning device has an opening through which the connecting element is introducible and slidable, and fixating means for preventing additional displacement of the connecting element after the length of the connecting element between the appendage portion and the foot engageable portion has been set.

In one aspect, the thigh engageable portion comprises one or more interface elements for stably engaging an interactable object.

In one aspect, the interactable object is a portable computer, such as a laptop computer, a netbook computer, a smartbook, a touch book, and a tablet.

In one aspect, each of the one or more interface elements is an angled element attached to the thigh engageable portion for engaging a corresponding corner of the portable computer.

In one aspect, each of the one or more interface elements is a loop defined by a cord fed through two apertures formed in the thigh engageable portion and secured, for engaging a corresponding corner of the portable computer.

In one aspect, the apparatus further comprises an adjusting device through which the cord fed through the two apertures is additionally fed, for adjusting the relative position of a portable computer engaged by two or more loops with respect to an abdomen facing edge of the thigh engageable portion.

In one aspect, the apparatus further comprises a device for changing the orientation of the portable computer or the distance of a portable computer screen from the eyes of the subject.

In one aspect, the interface object is an infant. The one or more interface elements may comprise a side restraint or a harness. The thigh engageable portion may comprise a rigid frame supportable on the thighs of the subject, a padded peripheral element attached to a lower face of said frame, and a central region delimited by said rigid frame and made of a stretchable fabric in which the infant is placeable and stably supported.

In one aspect, the thigh engageable member comprises an integral case.

In one aspect, the foot engageable member is a rigid board.

In one aspect, the thigh engageable member is made of two rigid boards that are pivotally connected together and covered by fabric, the thigh engageable member when partially opened serving as a case for the introduction within its interior of one or more components of the apparatus and said two covered boards being retainable in a closed position by means of a fastening device. For improved storability, the one or more interface elements may be two intersecting interface elements.

In one aspect, the foot engageable member comprises an elongated foot support placeable on the underlying surface, strap means attached at each end of said foot support which extends upwardly to an element with which a corresponding connecting element is engageable, and a foot restraining element extending between two of said elements with which a corresponding connecting element is engageable, said foot restraining element being folded over and reinforced at its middle portion to provide a divider which defines two foot insertable volumes, a forward and central portion of each lower leg being engageable by said foot restraining element following introduction of each foot into each of said volumes.

In one aspect, the foot engageable portion is a foot receivable cavity, such as a foot warmer and an open-backed clog.

In one aspect, the appendage portion is integrally formed with the thigh engageable portion.

In one aspect, the portion extending from the appendage portion to the foot engageable portion is integrally formed with the foot engageable portion.

In one aspect, the foot engageable portion is a cord for engaging both feet of the subject

BRIEF DESCRIPTION OF THE DRAWINGS

In the drawings:

FIGS. 3A-D schematically illustrate the degree of leg restraint that the stabilizing apparatus of the present invention provides with respect to the relative region of the thighs which is engaged thereby;

FIG. 20 is a top view of a portion of a foot engageable member, according to another embodiment of the invention;

FIG. 21 is a perspective view from the side of a shoe which is in abutting relation with the foot engageable member of FIG. 20;

FIG. 39 is a perspective view from the side of an apparatus for stabilizing inclined legs, when bodily engaged, according to another embodiment of the present invention;

FIG. 40 is a perspective view from the top of an infant being stably engaged by interface elements of the apparatus of FIG. 39;

DETAILED DESCRIPTION OF PREFERRED EMBODIMENTS

The present invention is related to novel leg stabilizing apparatus that is completely bodily engageable. Two flexible and tensionable appendages of a thigh engageable member for contacting the two thighs, respectively, of a subject are connectable to a foot engageable member by means of corresponding elongated and flexible connecting elements. The thigh engageable member extends generally transversally along the width of the lap when the two thighs of the subject are in contact, or in close proximity to each other. After the legs of the subject, including the thighs and the lower leg, i.e. between the knee and the foot, are positioned at a desired inclination and at a desired transversal spacing therebetween, the thigh engageable member appendages are tensioned by means of the connecting elements so as to apply forces which resist a forward foot sliding motion and relative transversal motion of a leg. The legs of the subject are therefore able to be comfortably retained at an inclined position for an extended period of time. The connecting elements for applying tension to the appendages can be simply readjusted if it is desired to change the inclination of a leg.

Figure 1:
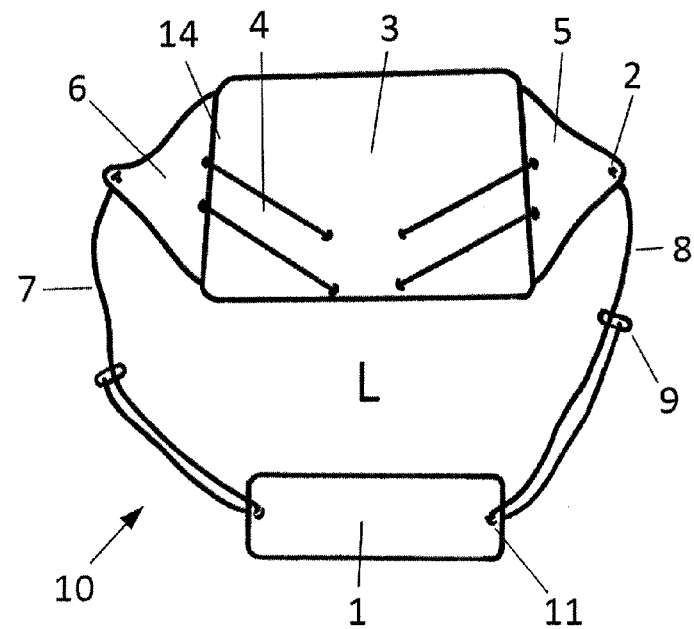
FIG. 1 is a plan view of an apparatus for stabilizing inclined legs, when not bodily engaged, according to one embodiment of the present invention.

FIG. 1 illustrates in plan view an apparatus for stabilizing inclined legs, when not bodily engaged, according to one embodiment of the present invention, and is generally designated by numeral 10. Thigh engageable member 3 may be rectangular and relatively flexible, and is interposed between two triangular appendages 5 and 6. One dimension of thigh engageable member 3 is approximately equal to the width of the lap, and the other dimension is equal to approximately two-thirds the length of the thighs. The triangular appendages are made of flexible or partially flexible material, such as cloth or netting, which is not tearable during normal usage of the apparatus. The wide side of spaced triangular appendages 5 and 6 is attached to the side edges, respectively, of thigh engageable member 3. Connecting elements 7 and 8 in the form of a cord are connected to an apical portion 2 of appendages 5 and 6, respectively, and are fed through an aperture 11 formed proximate to a corresponding side edge of foot engageable member 1. A tensioning device 9 is associated with each connecting element. As can be clearly seen, apparatus 10 defines a closed loop L.

Figure 2:
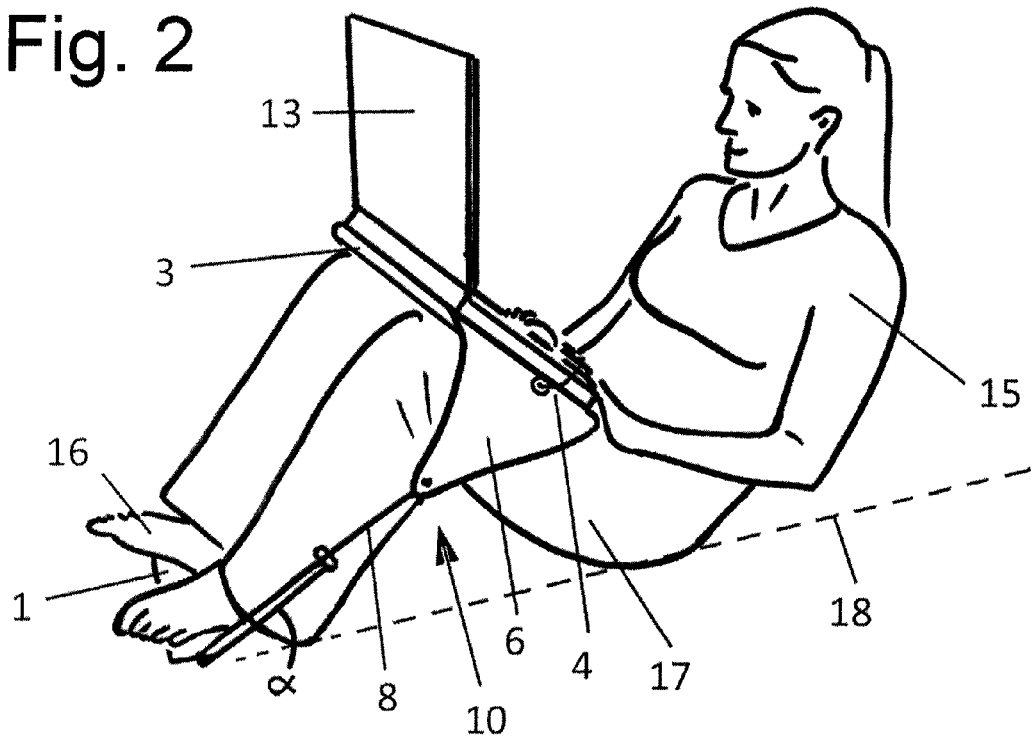
FIG. 2 is a perspective view from the side of the apparatus of FIG. 1, shown in bodily engagement with a subject performing an interactive operation.

A subject 15 is shown in FIG. 2 to be in a reclined position while the thighs 17 are placed in an inclined position with respect to the underlying surface 18, e.g. a floor surface, a mattress, or a mat. The two inclined thighs 17 of subject 15 are placed in abutting relation with each other, or are positioned with a relatively small transversal spacing therebetween, to define the lap and to facilitate interaction, for an extended period of time without muscular fatigue by virtue of the stabilizing action provided by apparatus 10, with a portable computer 13, or any other interactable unit placed on the lap.

The placement of feet 16 and/or foot engageable member 1 on underlying surface 18 after apparatus 10 has been placed in bodily engagement with subject 15 provides the reactive force for the apparatus. After subject 15 selects a desired thigh separation and leg inclination, the connecting elements are then suitably adjusted and tensioned. The tensile forces applied by, and the angle α with respect to underlying surface 18 of, each connecting element 8 complement the lower body stability of subject 15 to provide a surprisingly stable thigh engageable member 3. Substantial transversal movement of thigh 17 is restricted by contact with a corresponding appendage 6.

It will be appreciated that an underlying surface on top of which the feet of subject 15 are placed, e.g. a chair or a sofa, may be above or below the underlying surface 18 which supports another bodily portion of the subject.

As also shown in FIG. 1, thigh engageable member 3 may also comprise a plurality of angled interface elements 4, each of which extends obliquely with respect to a corresponding side 14 of the rectangular thigh engageable member 3. One end of each interface element 4, which is adapted to receive a corner of portable computer 13, may be attached to a corresponding appendage 5 or to thigh engageable member 3, and the other end thereof may be attached to an intermediate region of the thigh engageable member, by any attachment means well known to those skilled in the art.

Figure 24:
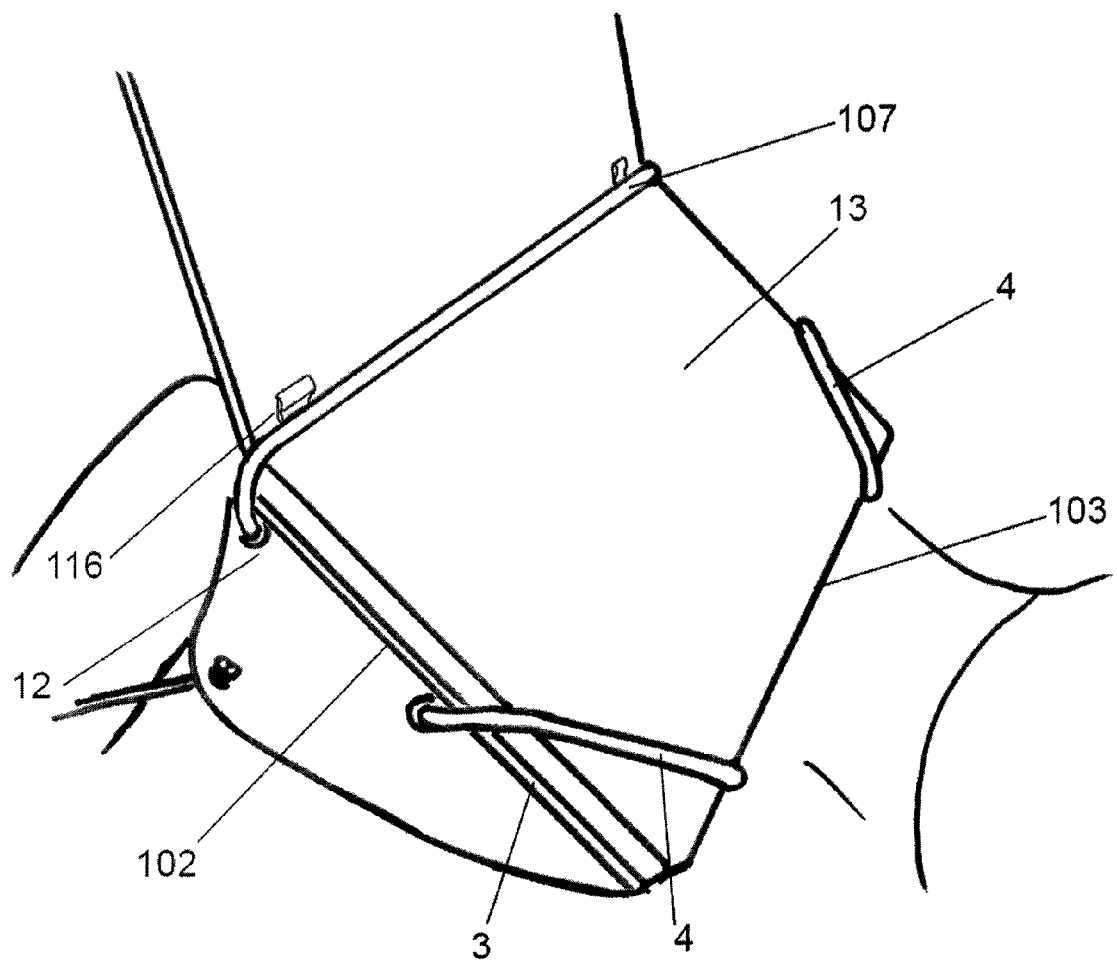
FIG. 24 is a perspective view from the side and top of a portable computer, shown being secured by a plurality of interface elements to a thigh engageable member.

For example, as shown in FIG. 24, each angled interface element 4 may be attached to an appendage facing region 102 and to an abdomen facing region 103 of thigh engageable member 3. Portable computer 13 may be additionally secured by means of a transversally extending interface element band 107 attached to a foot facing region of the wide side 12 of each appendage. Band 107 is adapted to engage a base portion of portable computer 13, in the vicinity of hinge 116 by which the screen pivots with respect to the base portion.

Figure 25:
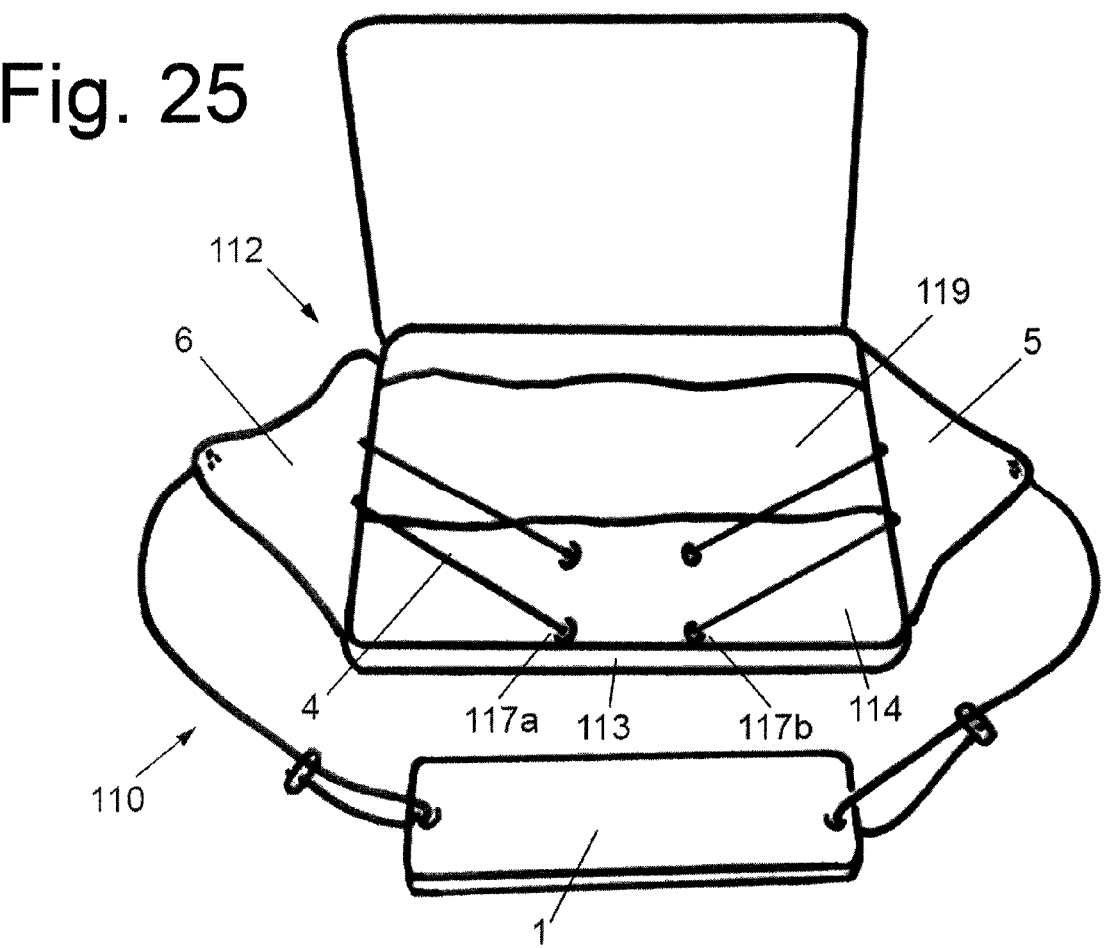
FIG. 25 is a plan view of a stabilizing apparatus provided with an integral case, when not bodily engaged, according to another embodiment of the present invention.

Angled interface elements 4 may also be used in conjunction with apparatus 110 shown in FIG. 25. Apparatus is similar to apparatus 10 of FIG. 1, with the exception of an integral computer case 112. Thigh engageable portion 113 interposed between triangular appendages 5 and 6 is formed integrally with the overlying case portion 114. Each interface element 4 is introduced into grommets 117*a* and 117*b* provided with case portion 114, e.g. provided with an abdomen facing wall of case portion 114. A netting pocket 119 is provided for storing foot engageable member 1 and other peripheral components, when necessary.

Figure 26:
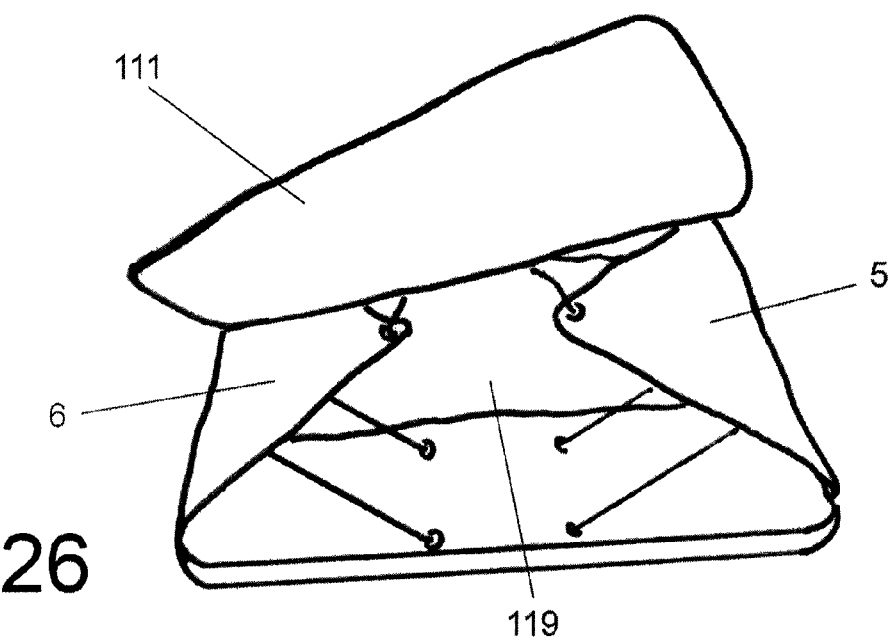
FIG. 26 is a perspective view from the top of the apparatus of FIG. 25 being stored within a dedicated pocket, while being covered.

At the end of an interactive operation, as shown in FIG. 26, triangular appendages 5 and 6 are folded over netting pocket 119. Computer case cover 111 is then folded over appendages 5 and 6 and fastened.

Referring back to FIG. 2, the loop defined by apparatus 10 serves to firmly restrain motion of the inclined legs when positioned in suitable bodily engagement with subject 15, i.e. when thigh engageable member 3 is placed on top of the thighs 17, when feet 16 are placed on top of foot engageable member 1, and when the connecting elements are properly tensioned. During an attempt of a forward foot sliding motion, whether consciously or unknowingly, foot engageable member 1 applies a restraining force onto foot 16. Likewise, the tensioned triangular appendage 6 applies a restraining force onto the side of a corresponding thigh 17 when the leg begins to move transversally and outwardly, to prevent additional leg movement.

As illustrated in FIGS. 3A-D, the relative position at which the thighs are engaged by the stabilizing apparatus influences the degree of leg restraint. When connecting element 28 engages thigh 17 proximate to knee 19, as shown in FIG. 3A, a relative transversal motion of thigh 17 is prevented; however, foot 16 is able to move forwardly. When connecting element 28 engages thigh 17 proximate to groin 21, as shown in FIG. 3B, a forward foot sliding motion is restrained; however, a relative transversal motion of thigh 17 is less restrained. In FIG. 3C, connecting element 28 is positioned at a central region of thigh 17, and consequently both a forward sliding motion of foot 16 and a relative transversal motion of thigh 17 are prevented. The usage of a triangular appendage 6, as shown in FIG. 3D, serves to distribute the pressure applied by the connecting element onto the side of thigh 17 when being stabilized, leading to a more pleasant interactive activity.

Figure 4:
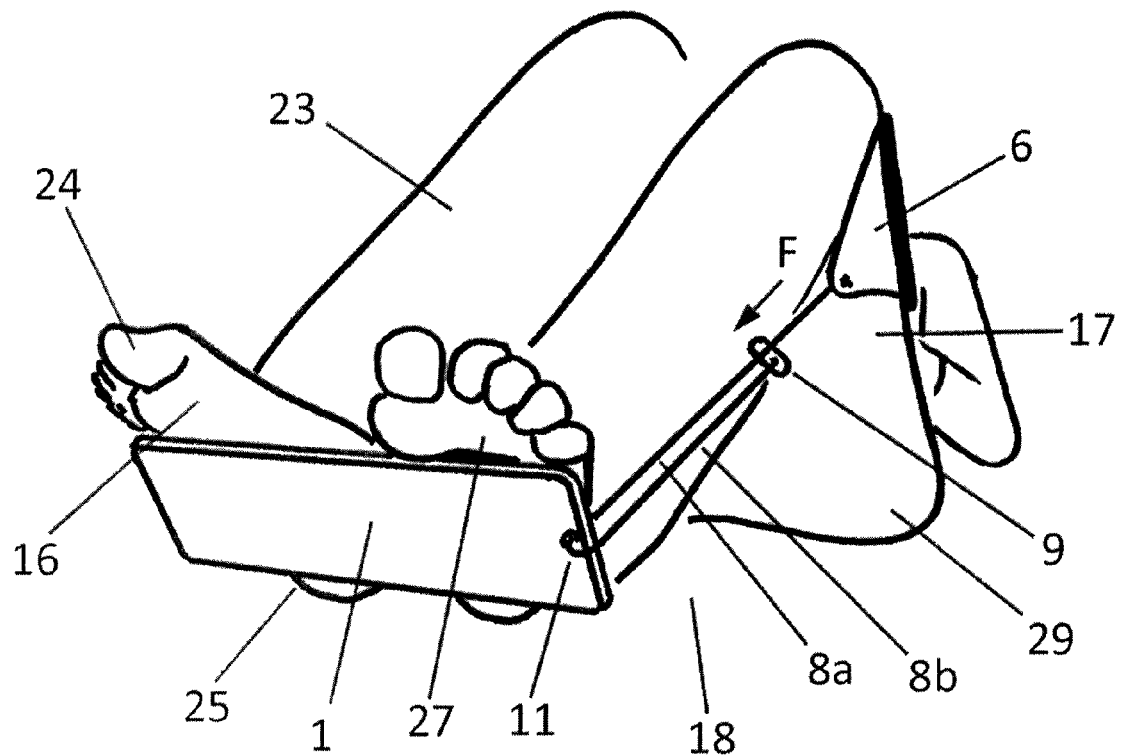
FIG. 4 is a perspective view of a foot engageable member, according to one embodiment of the invention, with which barefoot feet are in abutting relation.

As shown in FIG. 4, foot engageable member 1 is a rigid board, enabling barefoot feet 16 to be in contact therewith when the feet and foot engageable member 1 are inclined with respect to underlying surface 18, i.e. toes 24 are raised above heels 25 and soles 27 are in wide area abutting relation with foot engageable member 1.

Two connecting element portions are formed when the connecting element is fed through aperture 11 of foot engageable member 1. A first connecting element portion 8*a* extends from appendage 6 to foot engageable member 1, and a second portion 8*b* extends from foot engageable member 1 to tensioning device 9. Since the connecting element is fed through aperture 11 and not attached to foot engageable member 1, foot engageable member 1 can be easily interchanged with another type of foot engageable member, if so desired.

Connecting element portion 8*a* applies a tensile force F in the direction of foot engageable member 1 for tensioning appendage 6, after tensioning device 9 has been suitably manipulated. Tensile force F is of a significant value only if portion 8*a* has a defined and unchangeable length during the course of an interactive operation. More specifically, portion 8*a* will have a defined and unchangeable length only when feet 16 are placed on foot engageable member 1 and portion 8*b* is engaged by tensioning device 9. The end of portion 8*b* is engaged by tensioning device 9, and therefore portion 8*b* applies a tensile force F' opposite in direction to force F. Foot engageable member 1 transmits the pulling force F' to each foot 16. The relatively large surface area of foot engageable member 1 distributes the pressure applied by the pulling force onto the feet to provide a much more comfortable interactive activity than if the foot engageable member were significantly narrower, which would lead to localized and uncomfortable pressure regions being applied to the feet.

The length of connecting element portions 8*a* and 8*b* is dependent upon the relative inclination of the thighs 17 and the lower legs 23 relative to underlying surface 18, and also upon the spacing between feet 16 and the gluteal region 29. Portion 8b is pulled until appendage 5 is sufficiently tensioned to restrain leg movement. Apparatus 10 has been found to provide a satisfactory stabilizing action to the legs when the angle α (FIG. 2) between connecting element 8 and underlying surface ranges from approximately 15 degrees, corresponding to an outstretched foot position, to approximately 40 degrees. It will be appreciated that the two appendages may be tensioned to a different degree of tension by the corresponding connecting element if the two legs are positioned at a different inclination.

Figure 5:
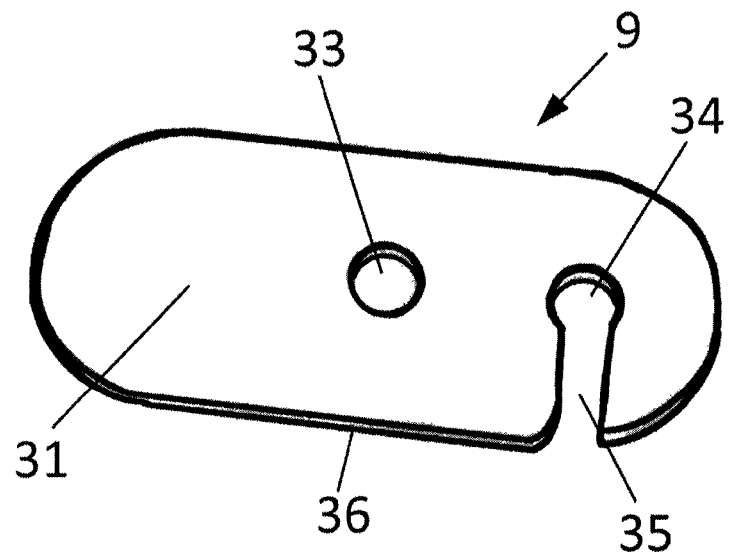
FIG. 5 is a front view of a tensioning device, according to one embodiment of the invention.

A front view of tensioning device 9 is illustrated in FIG. 5. Tensioning device 9 is a rounded plate 31, e.g. oval, formed with two circular apertures 33 and 34 of approximately equal dimensions. While aperture 33 is centrally located and completely surrounded by plate 31, aperture 34 is formed near the side of plate 31. A notch 35 having a width less than the diameter of aperture 34 extends from bottom surface 36, e.g. planar and rectangular, of plate 31 to aperture 34. The rounded periphery of plate 31 prevents discomfort to the subject when the legs are in an inclined position.

Figure 6:
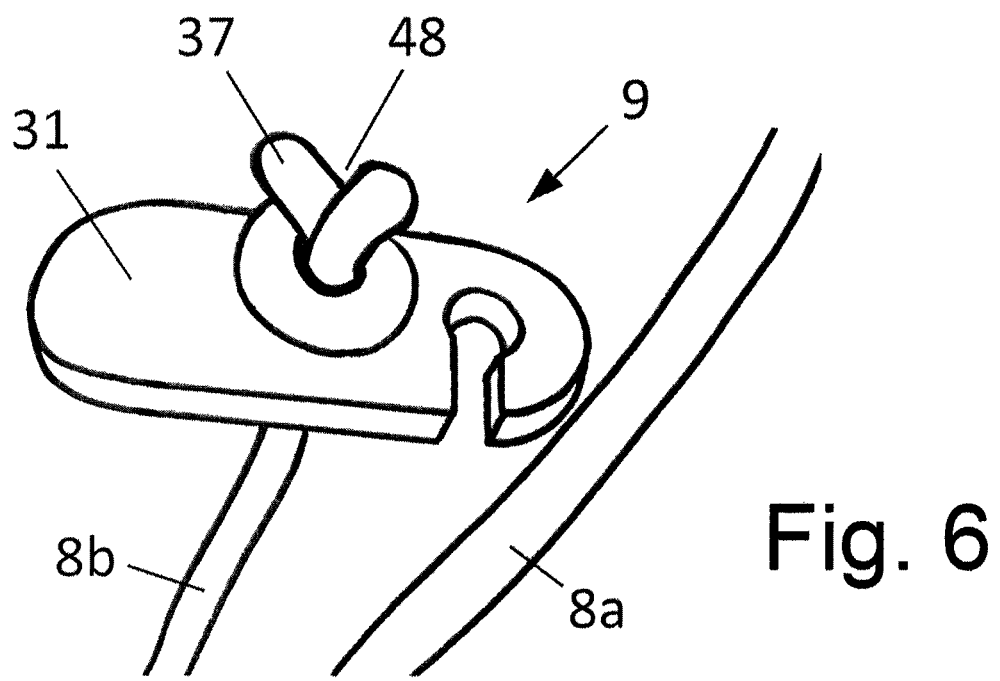
FIG. 6 is a front view of the tensioning device of FIG. 6, showing one cord portion that is engaged thereto.
Figure 7:
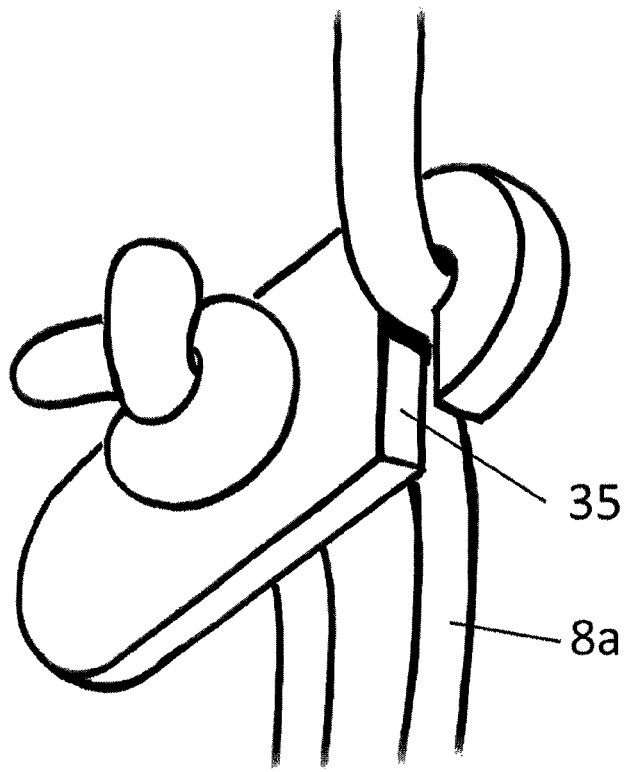
FIG. 7 is a perspective view from the front and bottom of the tensioning device of FIG. 6, showing two cord portion that are engaged thereto.

As shown in FIG. 6, cord portion 8b is introduced through aperture 33, and end 37 thereof is tied to form knotted portion 48, which is adapted to bear on plate 31 when cord portion 8b is being tensioned. Cord portion 8a, which is shown to be separated from tensioning device 9 in FIG. 6, is shown to be received and fixed in aperture 34 in FIG. 7. Since notch 35 is narrower than aperture 34, cord portion 8a will normally not be released from aperture 34. Notch 35 allows cord portion 8a to be easily removed from plate 31.

Figure 8:
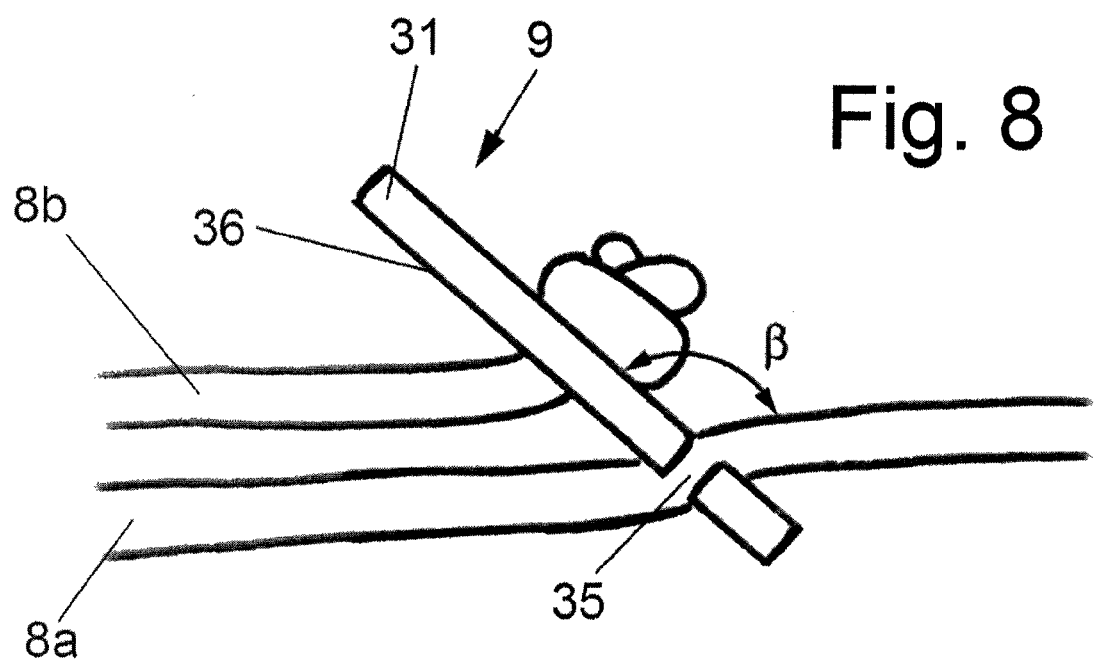
FIG. 8 is a bottom view of the tensioning device of FIG. 6, shown in a rotated fixating position with respect to two cord portions.

FIG. 8, which is a bottom view of tensioning device 9, illustrates an added measure for ensuring that the relative length of cord portions 8a and 8b will be retained and that the legs will therefore continue to be stabilized throughout an interactive operation. After cord portion 8a has been set to a desired length, plate 31 is rotated to an angle β between rectangular bottom surface 36 and cord portion 8a which is significantly greater than 90 degrees. At this angle, the walls of aperture 34 engage cord portion 8a, to prevent additional displacement of tensioning device 9 between the foot engageable member and the thigh engageable member.

Figure 9:
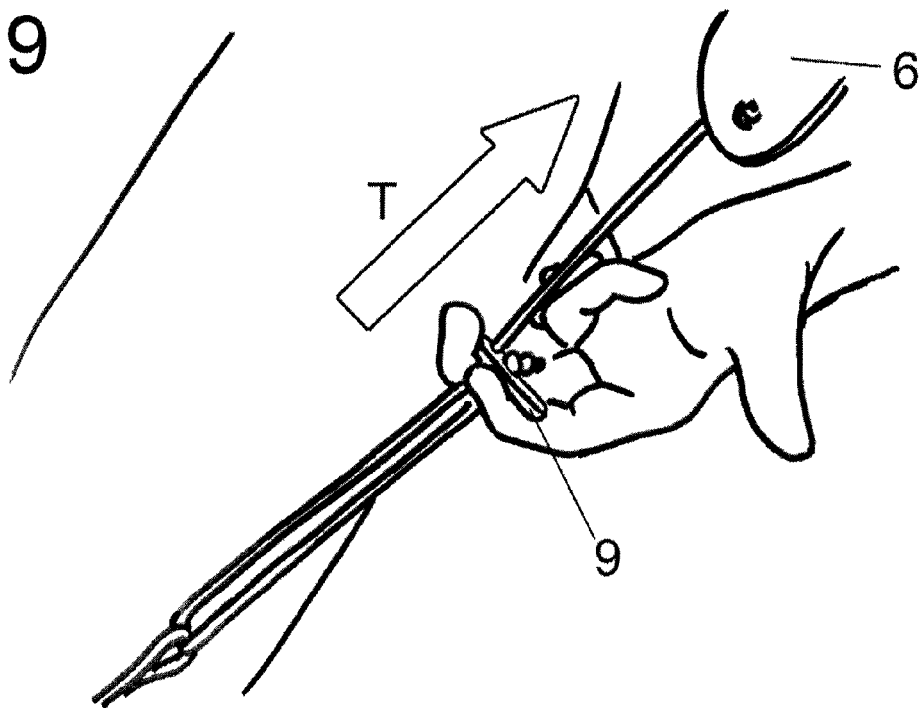
FIG. 9 is a bottom view of the tensioning device of FIG. 6 and of two cord portions with which it is in slidable relation, schematically illustrating a tensioning force being applied thereto.
Figure 10:
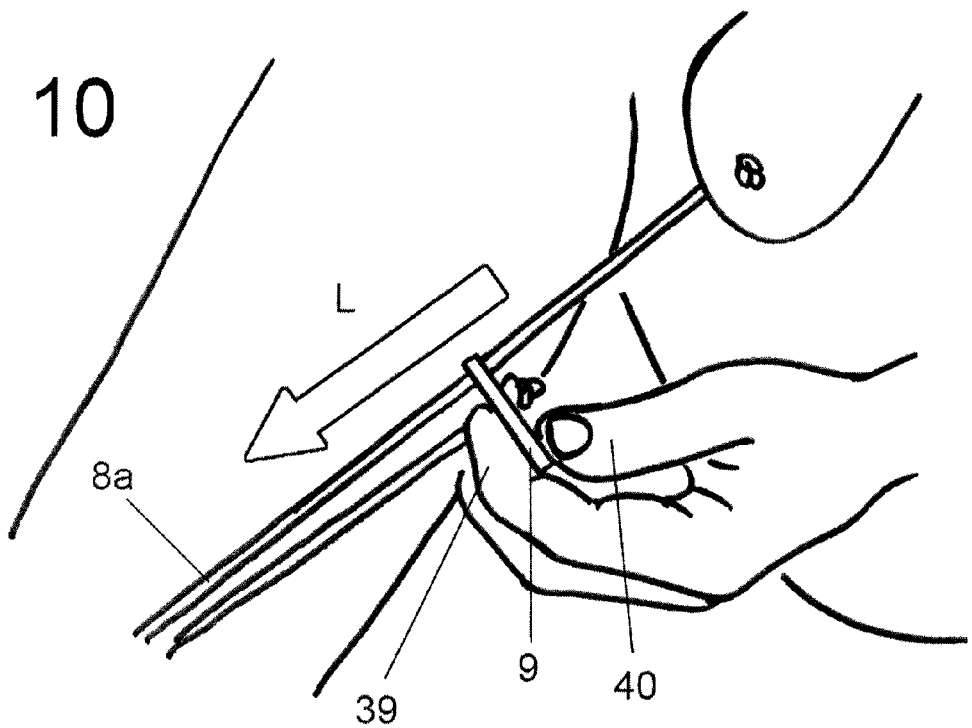
FIG. 10 is a bottom view of the tensioning device of FIG. 6 and of two cord portions with which it is in slidable relation, schematically illustrating a loosening motion being applied thereto.

Tensioning device 9 therefore affords the subject the ability to easily and quickly adjust the tension of the cord portions, such as when the inclination of the legs is changed. A tensioning force T can be applied, as shown in FIG. 9, by placing two fingers 39, between which the two cord portions are interposed, on the face of tensioning device 9 closest to the foot engageable member and simply pulling towards appendage 6. A loosening force for reducing the degree of the cord portion tension can be applied by first rotating tensioning device 9 until angle β (FIG. 8) is approximately 90 degrees, allowing the walls of aperture 34 to cease to be engaged with cord portion 8a. After cord portion 8a is no longer engaged by the walls of aperture 34, a loosening motion L schematically illustrated in FIG. 10 is applied by fingers 39 and thumb 40 to tensioning device 9 in the direction of the foot engageable member, causing tensioning device 9 to slide along cord 8a until a desired degree of tension is achieved. Tensioning device 9 is then rotated again in an opposite direction, to fixate cord portion 8a as shown in FIG. 8.

Figure 11:
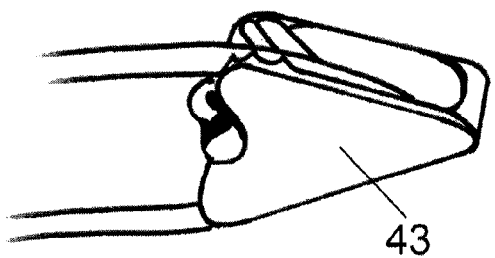
FIGS. 11 and 12 illustrate a perspective view from the side and top of two other embodiments, respectively, of an exemplary tensioning device.
Figure 12:
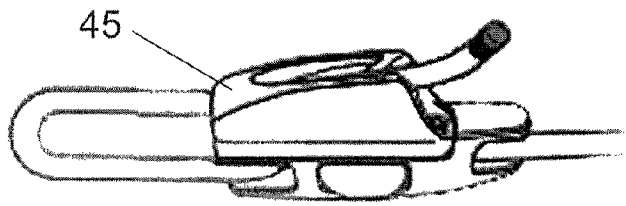

Alternatively, other types of tensioning devices having two apertures for the sliding therethrough of corresponding cord portions may be employed, such as a guy line tensioning device 43 shown in FIG. 11, and a clam cleat 45 shown in FIG. 12, all of which are well known to those skilled in the art, allowing for speedy tensioning and tension release operations, and need not be described for brevity.

Figure 13:
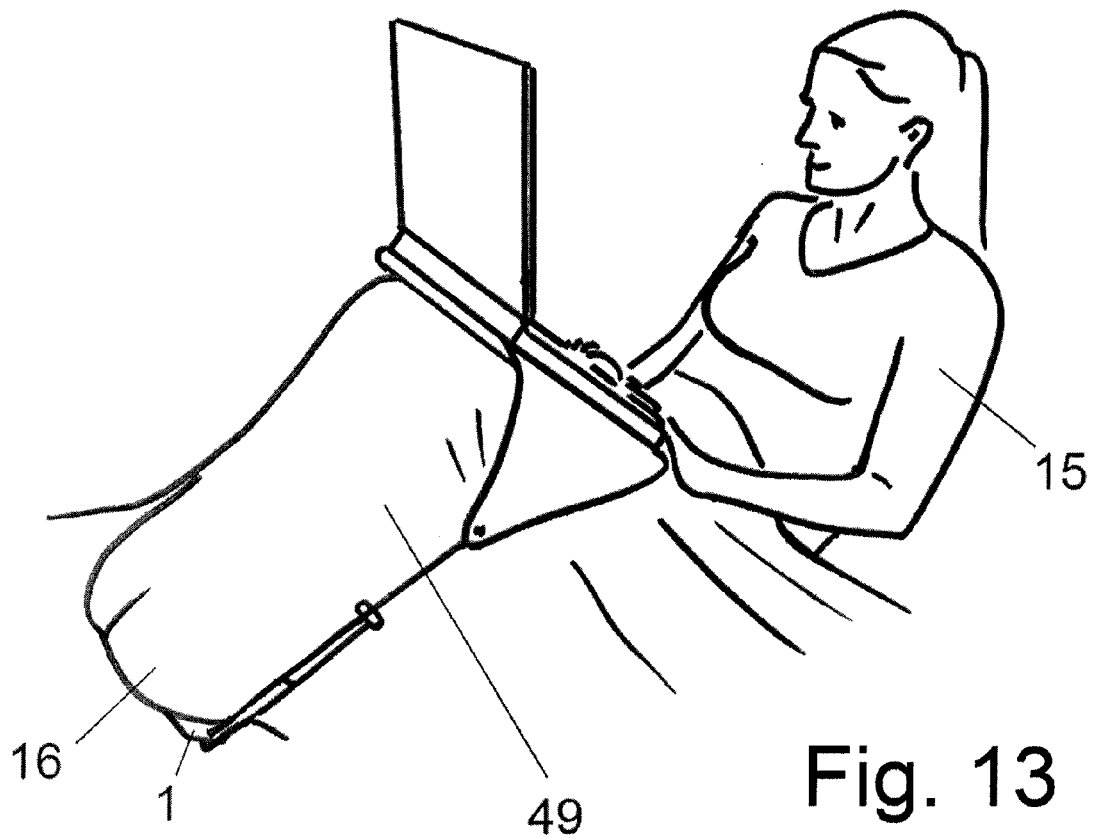
FIG. 13 is a perspective view from the side of the apparatus of FIG. 1 when in bodily engagement with a subject performing an interactive operation, showing a body covering element which covers the legs of the subject 15.

As shown in FIG. 13, a body covering element 49, such as a sack or a blanket, may be used to cover the legs of subject 15, which are stabilized by means of apparatus 10 and to provide warmth and comfort. In addition to providing warmth and comfort, covering element 49, when positioned between feet 16 and foot engageable member 1 and having a sufficiently high coefficient of friction, will prevent slippage of foot engageable member under the heels towards the gluteal region.

Figure 14:
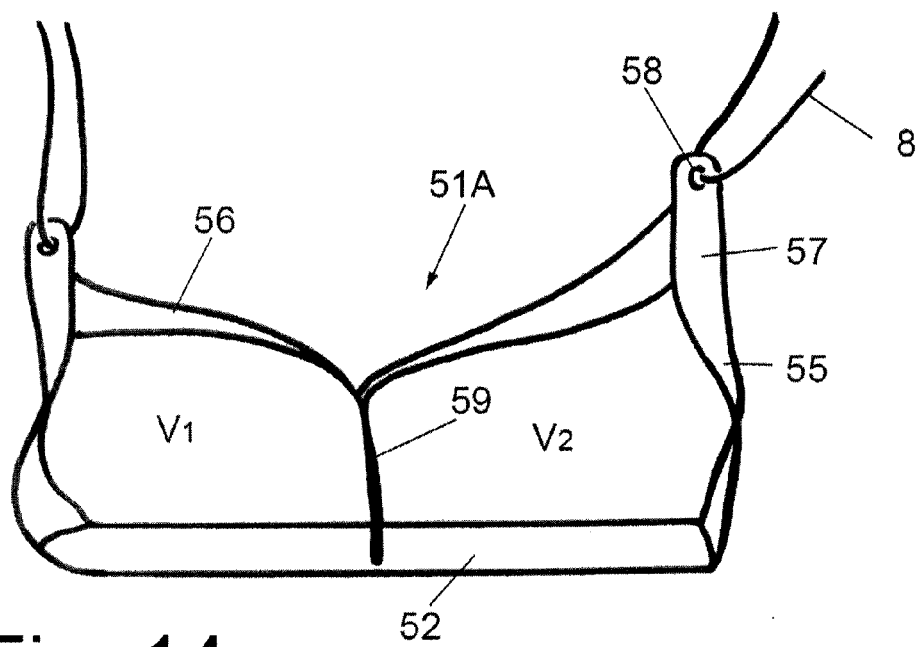
FIG. 14 is a front view of a foot engageable member, according to another embodiment of the invention.
Figure 15:
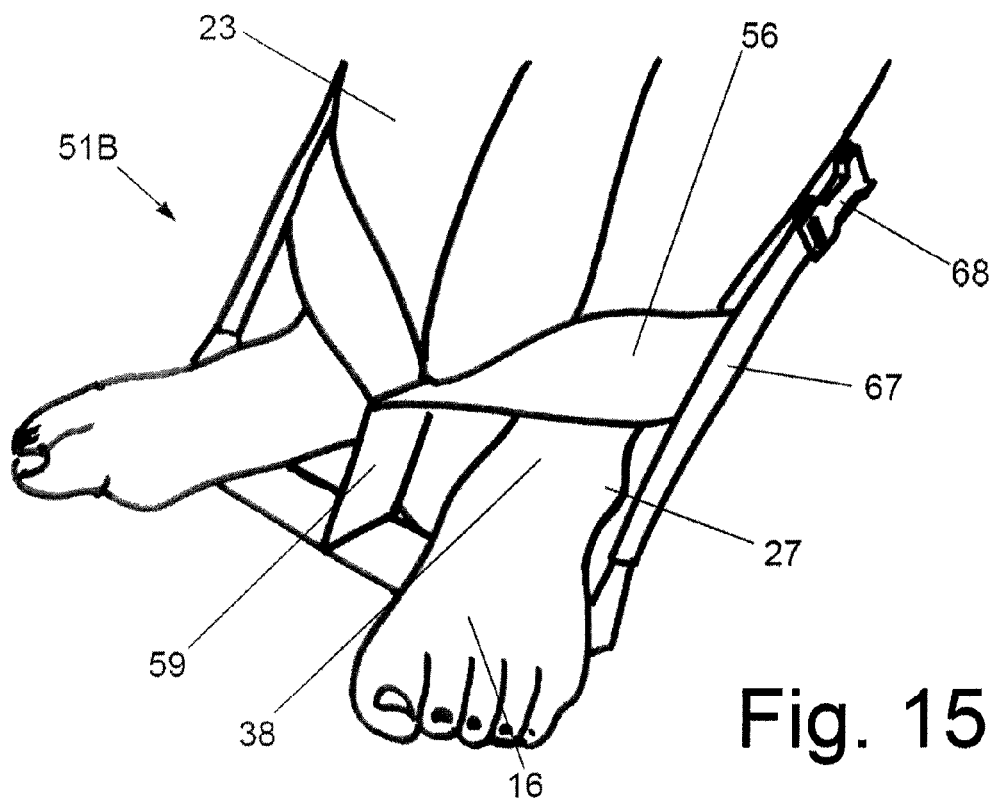
FIG. 15 is a perspective view from the front and top of a foot engageable member, according to another embodiment of the invention, showing two feet in abutting relation therewith.

FIGS. 14 and 15 illustrate another embodiment of a foot engageable member for use with barefoot feet, or with feet on which socks are worn.

As shown in FIG. 14, foot engageable member 51A comprises an elongated foot support 52, e.g. rectangular, which is placeable on the underlying surface. A strap 55 attached at each end of foot support 52 extends upwardly to a corresponding grommet bearing element 57 provided with a grommet 58 through which connecting element 8 in the form of a cord is fed. A strap-like foot restraining element 56 extends between the two grommet bearing elements 57, and is folded over and reinforced at its middle portion to provide a divider 59, thereby defining foot insertable volumes $V_1$ and $V_2$.

In FIG. 15, a foot 16 is inserted within each of the foot insertable volumes $V_1$ and $V_2$ of foot engageable member 51B. Foot engageable member 51B is identical to foot engageable member 51A, with the exception of buckle bearing element 67 which is attached to buckle element 68 instead of being provided with a grommet bearing element. Foot restraining element 56 is adapted to engage a forward and central portion 38 of each lower leg 23 slightly above the ankle 27. A central wide-area portion of restraining element 56 between divider 59 and a corresponding buckle bearing element 67 is adapted to painlessly engage lower leg portion 38 while distributing the pulling force, which is directed towards the gluteal region and transmitted by foot engageable member 51B. Thus different sized feet or lower legs can be inserted within each of volumes $V_1$ and $V_2$ and be restrained without requiring adjustment of the restraining element.

FIGS. 16-19 illustrate the strap based tensioning device that is operable in conjunction with foot engageable member 51B.

Figure 16:
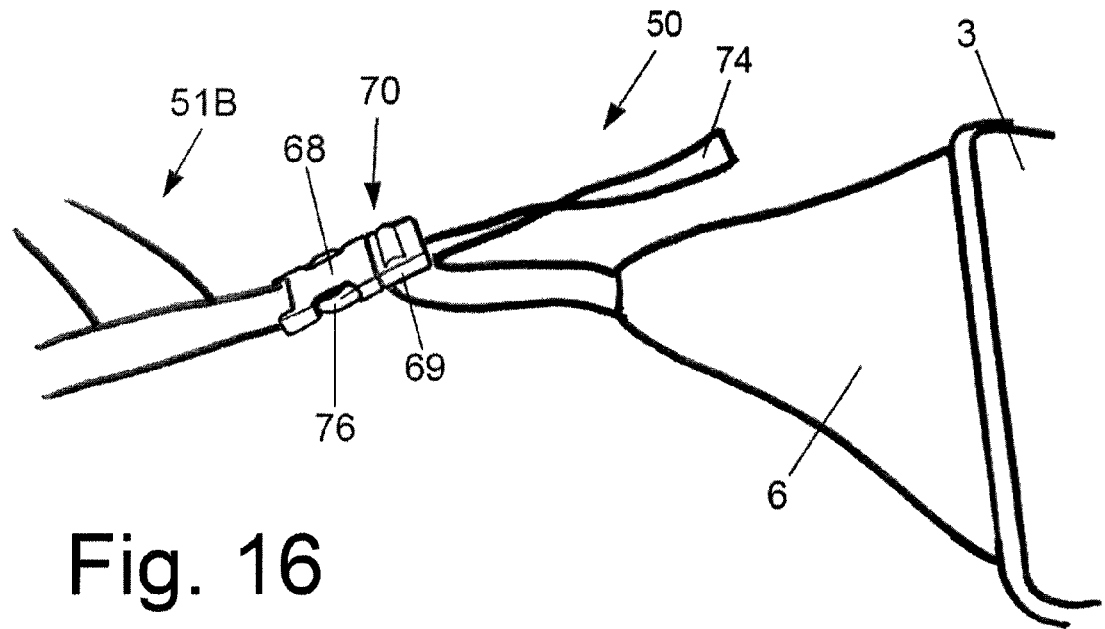
FIG. 16 is a partial plan view of an apparatus for stabilizing inclined legs, when not bodily engaged, comprising the foot engageable member of FIG. 15.

Stabilizing apparatus 50 illustrated in FIG. 16 comprises thigh engageable member 3, triangular appendage 6, foot engageable member 51B, and tensioning device 70. Tensioning device 70 comprises two connectable buckle elements 68 and 69. A strap 74 is attached to the apical region of each triangular appendage and is fed through a gap of buckle element 69.

Figure 17:
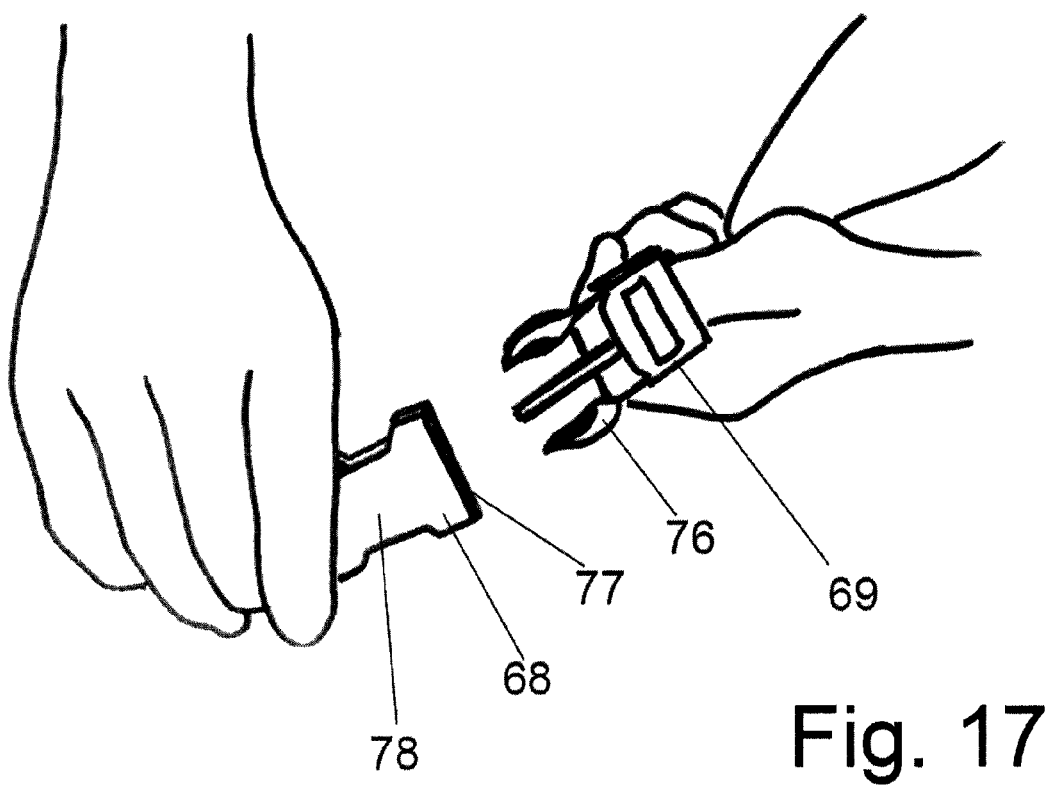
FIG. 17 is a side view of a tensioning device used in conjunction with the apparatus of FIG. 16.

As shown in FIG. 17, buckle element 69 comprises a plurality of spaced prongs 76 which are insertable in, and connectable to, socket 77 of buckle element 68. When buckle elements 68 and 69 are coupled together, upper and lower prongs 76 pass through socket 77 and are accessible above and below, respectively, the central portion 78 of buckle element 68, as shown in FIG. 16. In order to release buckle element 69 from buckle element 68, upper and lower prongs 76 are pressed together.

Figure 18:
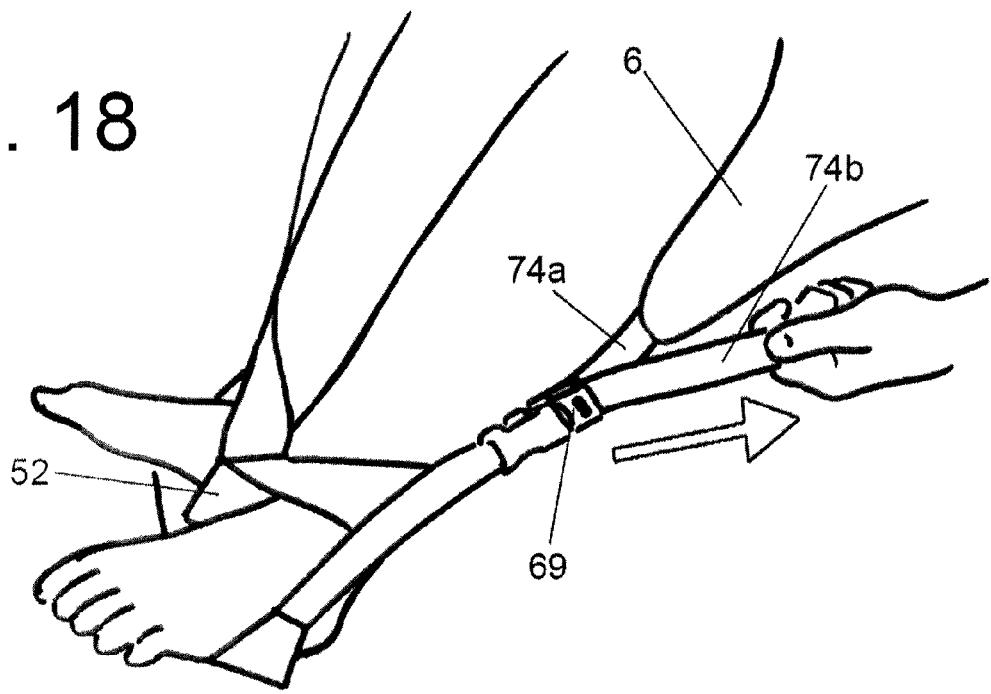
FIG. 18 schematically illustrates the application of a tensioning force with the tensioning device of FIG. 17.
Figure 19:
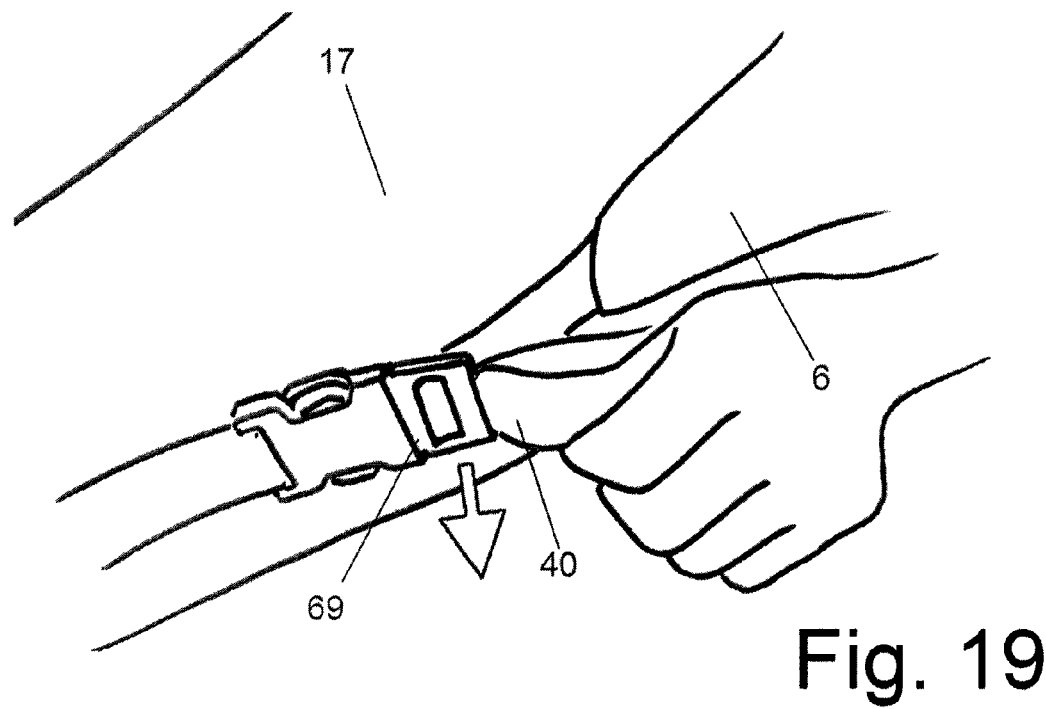
FIG. 19 schematically illustrates the application of a loosening force with the tensioning device of FIG. 17.

As shown in FIG. 18, appendage 6 may be tensioned, or alternatively foot support 52 may be brought closer to the gluteal region, by pulling on the free end of strap portion 74b which extends from buckle element 69 towards appendage 6 and causing the length of strap portion 74a to be shortened. FIG. 19 illustrates the loosening of appendage 6, or alternatively the distancing of foot support 52 from the gluteal region, by pushing on buckle element 69, e.g. with the thumb 40, away from thigh 17, as well known to those skilled in the art.

FIGS. 20 and 21 illustrate another embodiment of a foot engageable member which is adapted for use when a subject is wearing shoes, or any other type of footwear.

As shown in FIG. 20, foot engageable member 81 is in the form of a thickened cord, or alternatively a bar, and is provided at its two ends with an eyelet 83 through which a corresponding connecting element is feedable and displaceable.

As shown in FIG. 21, foot engageable member 81 is particularly useful when engaged by each sole 86 of a pair of running shoes 84, or of any other type of footwear. Foot engageable member 81 may be received in a groove between two adjacent rows of traction elements 88, to prevent its release. The cushioning provided by sole 86 helps to make the localized pressure applied by foot engageable member 81 onto the foot not to be felt. Due to its narrow dimensions, foot engageable member 81 will tend not to be soiled by dirt that clings to sole 86.

Figure 22:
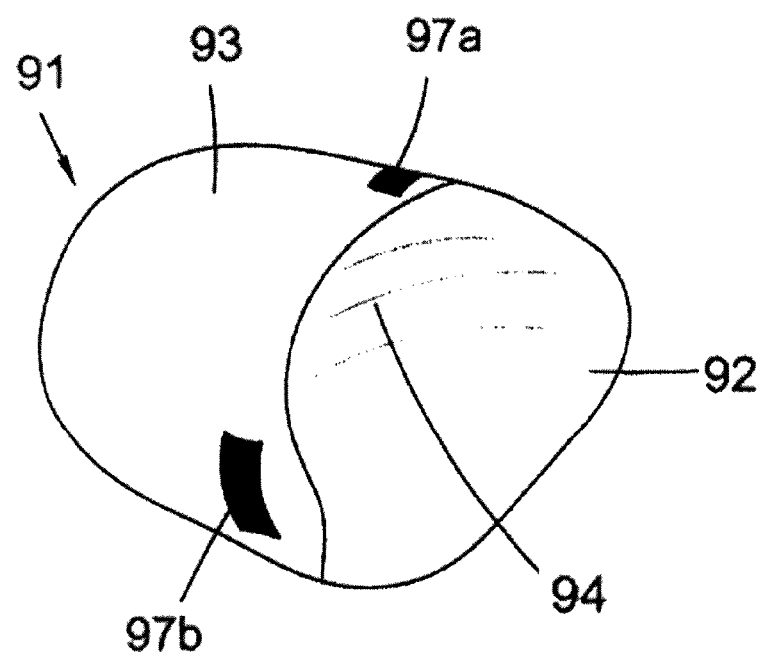
FIGS. 22 and 23 are perspective views from the top and side of two additional embodiments, respectively, of a foot engageable member.

FIG. 22 illustrates a foot engageable member 91 which has a bottom surface 92 and an arcuate covering 93 projecting above bottom surface 92 to define a cavity 94 in which the feet of the subject are insertable and engageable. Attachment elements 97a-b by which a corresponding connecting element, e.g. a buckle bearing element, is attached to covering 93 are schematically illustrated.

If so desired, each foot of the subject may be inserted in, and engaged by, a corresponding cavity shaped foot engageable member 91. Each foot engageable member 91 may be provided with a single attachment element in a central region of covering 93, to allow the corresponding connecting element to suitably tension an appendage of a thigh engageable member.

Figure 23:
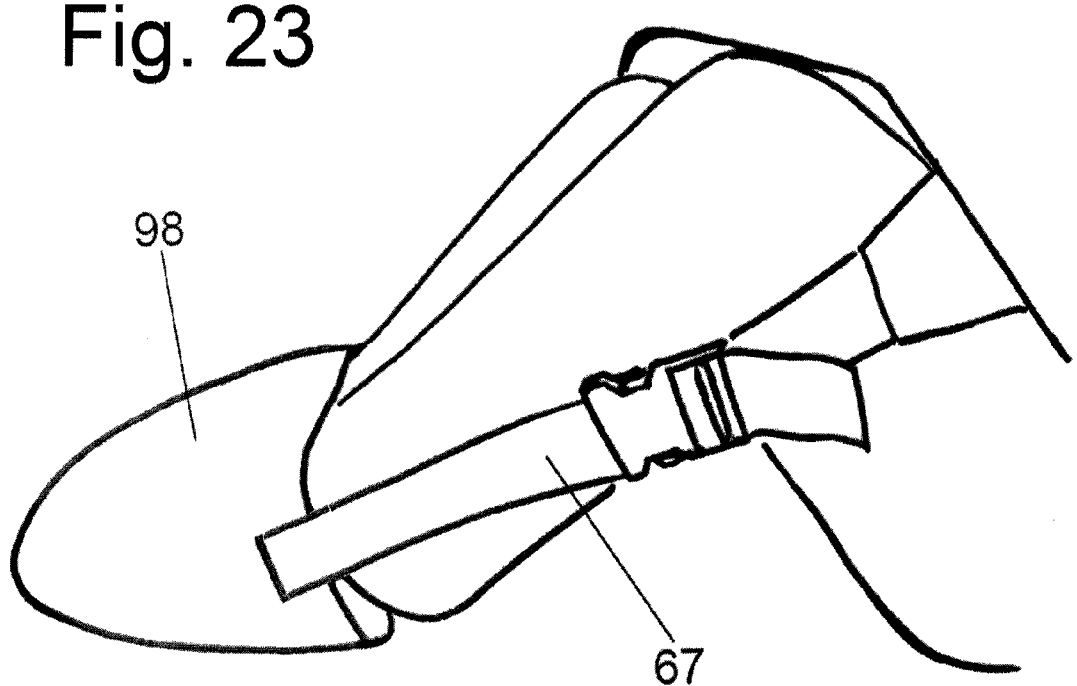

As shown in FIG. 23, the cavity shaped foot engageable member may be a foot warmer 98, to provide added comfort to the subject. Strap-like buckle bearing element 67 is shown to be attached to the inner surface of the padded covering of foot warmer 98. Foot warmer 98 may comprise one or more active heating elements.

Alternatively, the cavity shaped foot engageable member may be an open-backed clog.

Figure 27A:
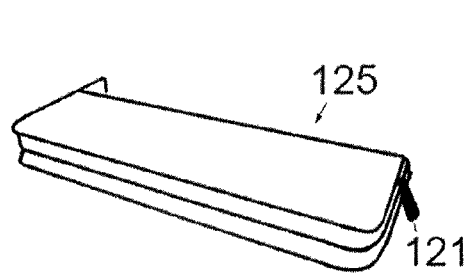
FIGS. 27A and 27B are a perspective view of a closed and partially opened case, respectively, according to another embodiment of the present invention.
Figure 27B:
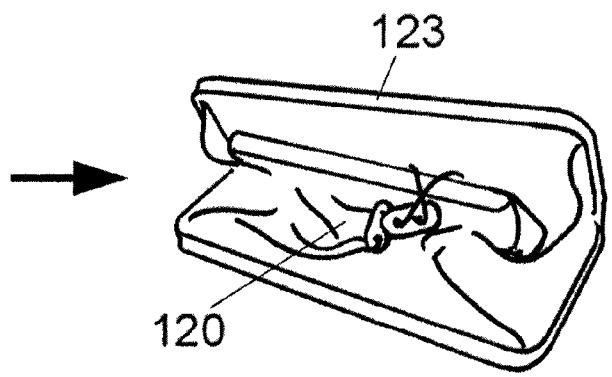
Figure 27D:
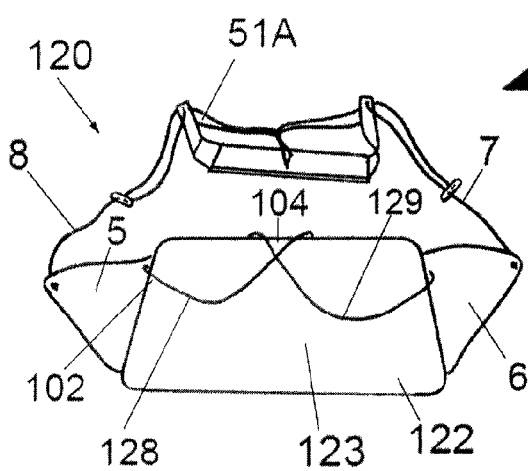
FIGS. 27C and 27D are a plan view of the bottom and top, respectively, of stabilizing apparatus, when removed from the interior of the case of FIG. 27A and not bodily engaged.
Figure 27C:
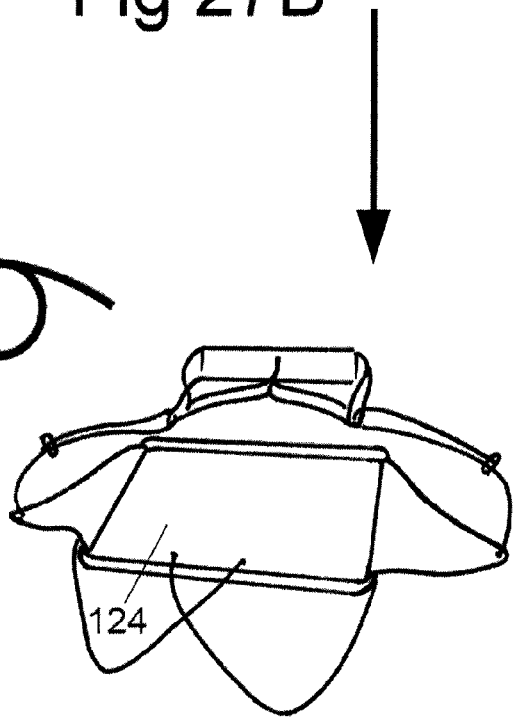

FIGS. 27A-D illustrates a thigh engageable member that serves as a case. FIG. 27A illustrates a fashionable case 125 in which is storable the stabilizing apparatus when not in use. When zipper 121, or any other suitable fastening device, of case 125 is manipulated to open the case, the stored apparatus 120 becomes accessible, as shown in FIG. 27B. When the case is partially opened, apparatus 120 may be introduced within its interior. In order to retain the case in a partially opened position, thigh engageable member 123 is made of two rigid boards that are pivotally connected together and covered by fabric. Accordingly, thigh engageable member 123 can be folded in half and have enough structural integrity to remain partially opened when the remaining components of apparatus 120 shown in FIG. 27D, including appendages 5 and 6, connecting elements 7 and 8, and foot engageable member 51A are being inserted within the interior of the case. Upper face 122 of thigh engageable member 123 is imprinted with a fashionable design, while the bottom face 124 thereof shown in FIG. 27C is provided with cushioning elements and may be ventilated. Foot engageable member 51A may be imprinted with a similar design as thigh engageable member 123.

It will be appreciated that any other foot engageable member or connecting element described herein may also be stored in case 125.

Thigh engageable member 123 is shown to be provided with two intersecting interface elements 128 and 129 in the form of cords. A first end of each interface element is attached to foot facing region 104 of thigh engageable member 123, and a second end thereof is attached to a corresponding appendage facing region 102.

Figure 28:
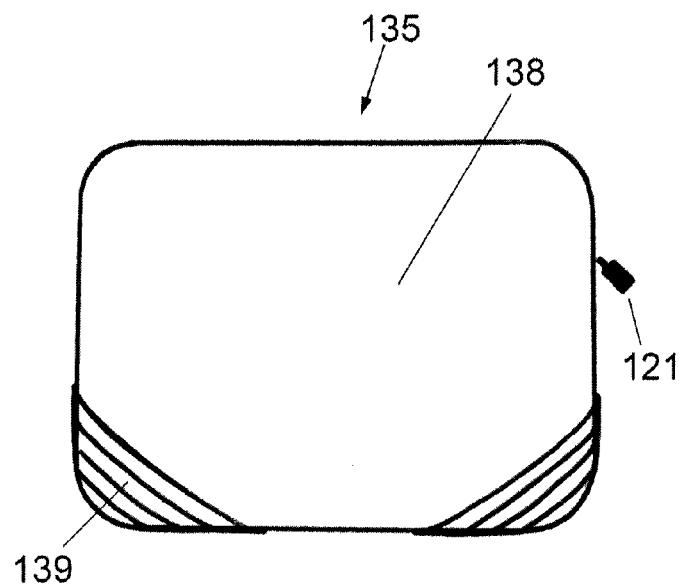
FIG. 28 is a front view of a case having a compressible base portion with which a portable computer is engageable.
Figure 29:
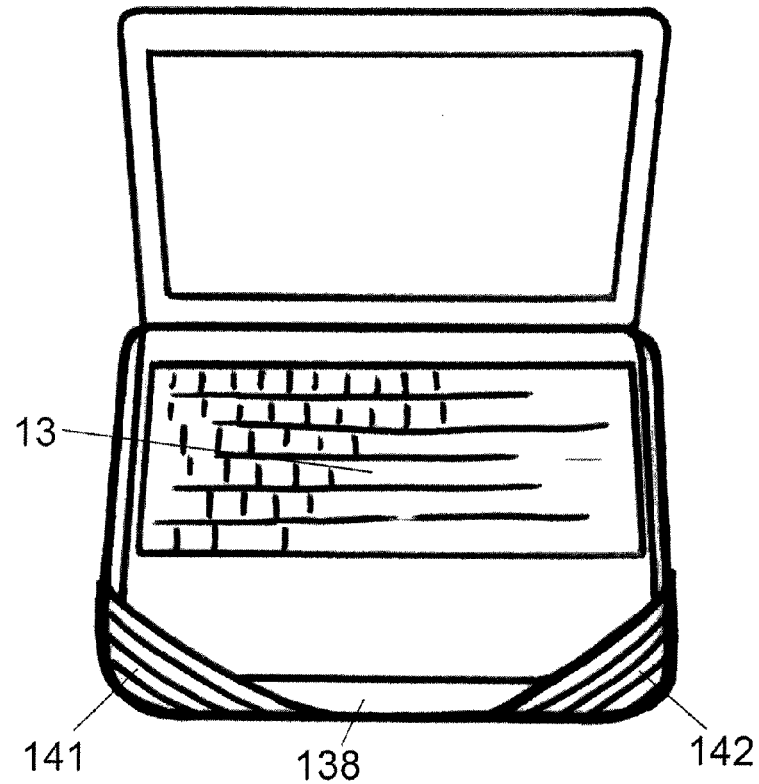
FIG. 29 is a front view of the case of FIG. 28, showing a portable computer in engagement with its base portion and being secured by its interface elements.

Another case is shown in FIGS. 28 and 29. Case 135, which may be rectangular, comprises a compressible base portion 138 within which a portable computer can be inserted when zipper 121 is opened, in order to be protected during transportation, and also a retaining portion 139 attached to base portion 138 and separable from a front face of the base portion. Base portion 138 is normally in contact with retaining portion 139, as shown in FIG. 28; however is compressed when it is desired that portable computer 13 will be retained by case 135 for use during an interfacing operation, as shown in FIG. 29. Retaining portion 139 has two triangular corners 141 and 142 that overly the front face of base portion 138 to serve as interface elements for receiving and securing portable computer 13. Base portion 139 is compressible and can serve as a thigh engageable member.

Figure 30:
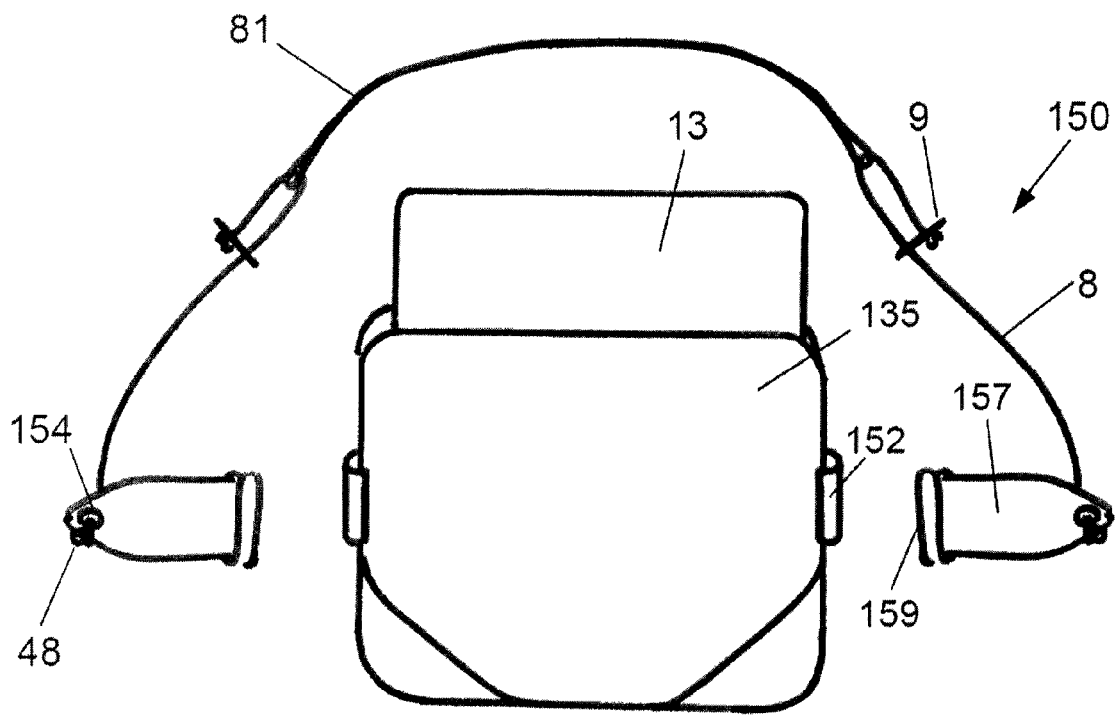
FIG. 30 is a plan view of a stabilizing apparatus which comprises the case of FIG. 28 and releasably attachable appendages, when not bodily engaged, according to another embodiment of the present invention.

FIG. 30 illustrates another embodiment of stabilizing apparatus 150 for use in conjunction with case 135. Each appendage facing region of the base portion of case 135 may be provided with a cylindrical fabric ring 152, or any other attachment element having an elongated and narrow cavity. In this embodiment, the appendage to the thigh engageable member is a relatively narrow strip 157. Engaged with one end of appendage 157, e.g. by means of a cylindrical fabric ring, is a hook element 159 slightly longer than the width of both appendage 157 and cylindrical fabric ring 152 attached to the base portion. At the other end of appendage 157, e.g. a triangular portion, is fitted a grommet 154, to which connecting element 8 is attached, e.g. by means of a knotted portion 48, or by means of a T-bar. Each connecting element is fed through foot engageable member 81, and the length of a connecting element portion is adjustable by means of tensioning device 9.

When each hook element 159 is introduced into a corresponding fabric ring 152, thigh engageable member 157 becomes securely attached to the base portion of case 135. Appendage 157 will then be able to restrain leg movement when stabilizing apparatus 150 is placed in bodily engagement with a subject. Upon completion of the interactive operation, appendages 157 are detached from the corresponding fabric rings 152, allowing case 135 together with the portable computer storable therewithin to be conveniently carried to a desired location.

Figure 31:
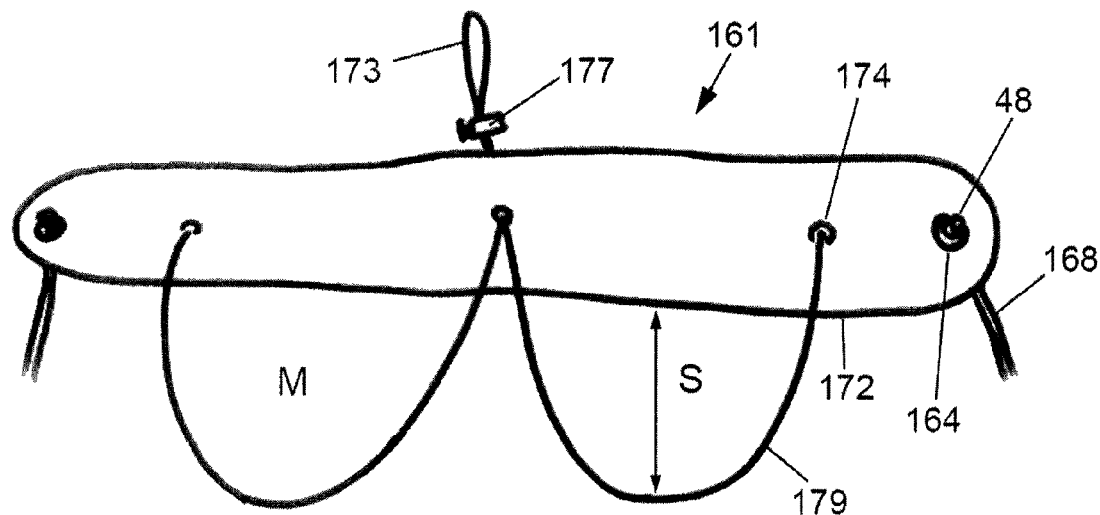
FIG. 31 is a plan view of a thigh engageable member which has an integral appendage portion.
Figure 32:
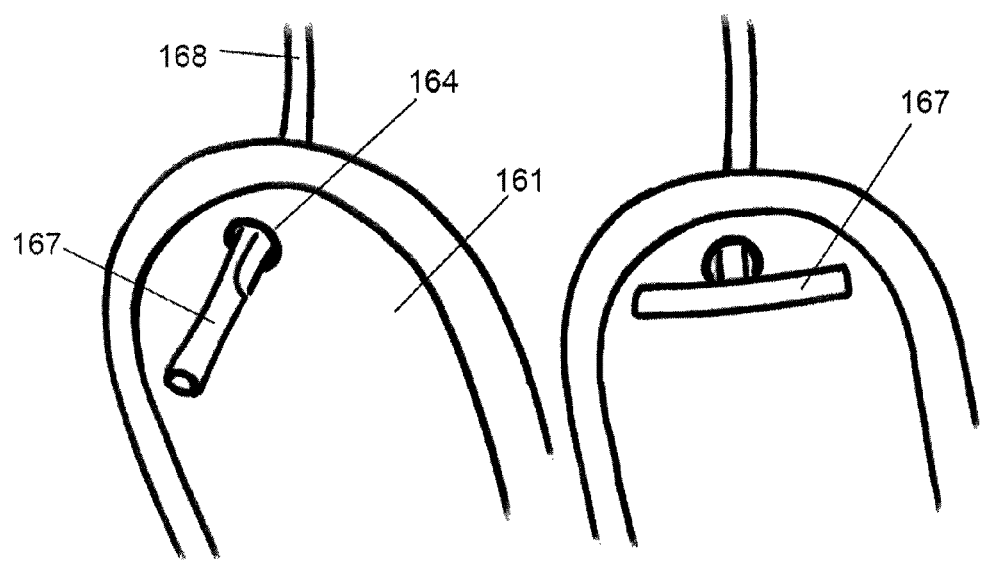
FIG. 32 illustrates two steps for attaching a connecting element to the thigh engageable member of FIG. 31 by means of a T-bar.

FIG. 31 illustrates another embodiment of a thigh engageable member, which has an integral appendage portion and enables adjustment of the relative position of a portable computer secured thereto, as will be described hereinafter. Thigh engageable member 161 is a thin, flexible and elongated element, e.g. oval shaped. The width of thigh engageable member 161 is approximately equal to one-quarter the length of the thighs. At each end of thigh engageable member 161 is fitted a relatively large sized grommet 164, for attachment of a connecting element 168 thereto by means of a knotted portion 48 as shown, or alternatively, by means of a T-bar 167 shown in FIG. 32, which is introducible through grommet 164 and then its orientation is changeable to prevent release from grommet 164.

Intermediate to the two relatively large sized grommets 164 are fitted a plurality, e.g. three, of relatively small sized grommets 174. A single continuous cord 173 is fed through each of the intermediate grommets 174 in such a way to produce a U-shaped loop M between each pair of adjacent intermediate grommets 174, and is then introduced through adjusting device 177. The size of each loop M, or the maximum spacing S of a laptop engageable cord portion 179 from the abdomen facing edge 172 of thigh engageable member 161, may be adjusted by moving adjusting device 177 along cord 173 until contacting the bottom of thigh engageable member 161, at a central region thereof adapted to be positioned between the legs of the subject.

Figure 33:
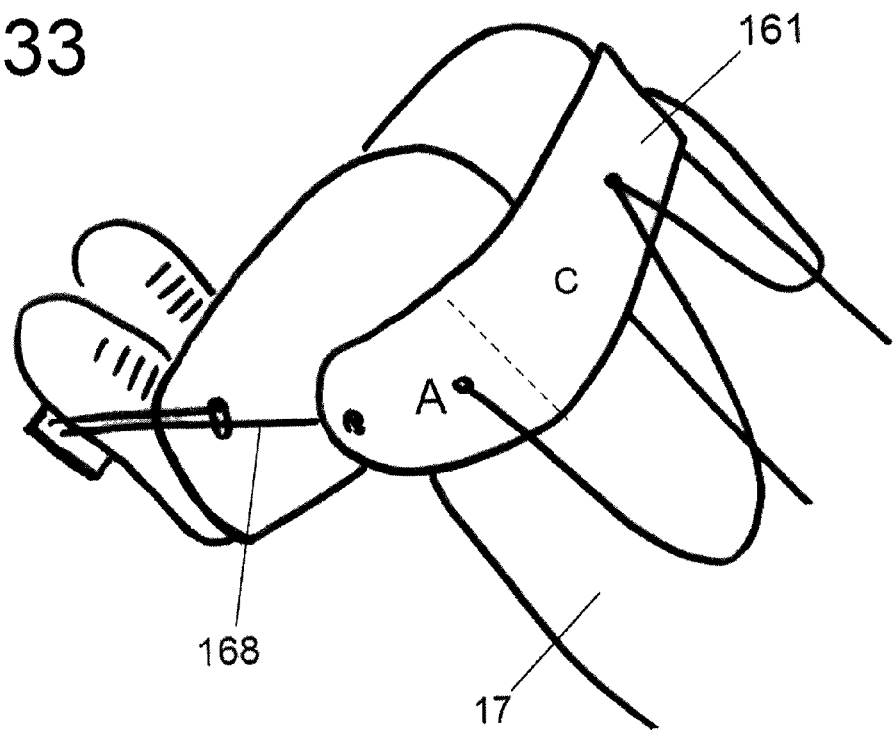
FIG. 33 is a perspective view from the top and side of the thigh engageable member of FIG. 31 in bodily engagement with a subject, showing the integral appendage and thigh engageable portions.

Thigh engageable member 161 is shown in FIG. 33 to be positioned in bodily engagement with the thighs 17 of a subject. Since the length of thigh engageable member 161 is longer than the combined width of the lap, a portion A of thigh engageable member 161 is caused to be folded over as a result of the tensile force applied in the direction of the foot engageable member by connecting element 168. While the length of central portion C of thigh engageable member 161 corresponds to the general width of the lap, the folded integral appendage portion A extends downwardly from the upper surface of the thighs 17 and serves to contact the side of the corresponding thigh and to thereby resist movement of the legs during the course of an interactive operation. Central portion C is preferably flexible, and may be provided with a rigid or semi-rigid region, e.g. with a reinforcement element and/or with cushioning elements at selected locations.

Figure 34:
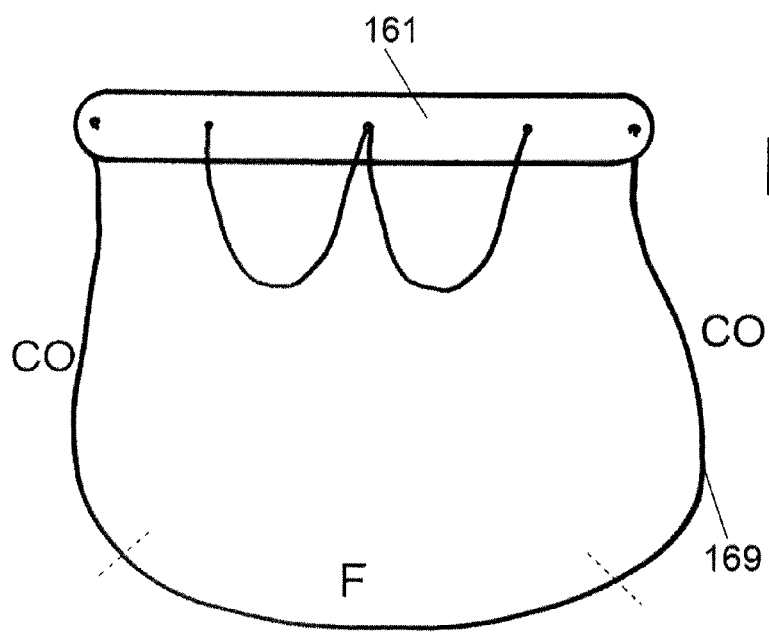
FIG. 34 is a plan view of a stabilizing apparatus which comprises the thigh engageable member of FIG. 31, and integral foot engageable and connecting portions.

A connecting element 168 can be adjustably connected to the foot engageable member as shown in FIG. 33, or alternatively, a connecting element 169 may be of a fixed length as shown in FIG. 34. The fixed length connecting element 169 has integral foot engageable portion F and connecting portions CO, and is suitable for a subject of specific dimensions and for a specific position. Alternatively, fixed length connecting element 169 may be fed through two ends of thigh engageable member 161, to define two pairs of cord portions. The relative length of the two cord portions of each pair is adjustable by means of a corresponding tensioning device.

Figure 35A:
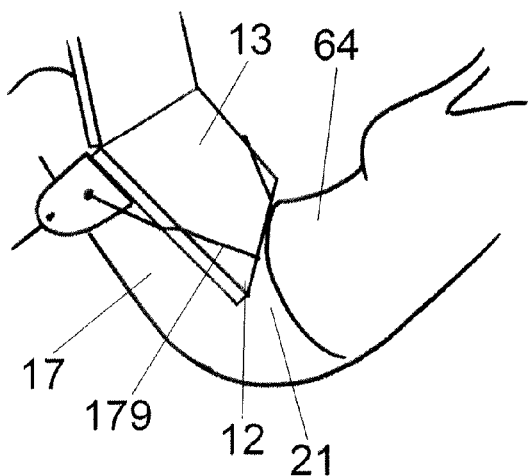
FIGS. 35A-D schematically illustrate different relative positions of a portable computer that are achievable with respect to an abdomen facing edge of the thigh engageable member of FIG. 31, and the corresponding degree of comfort of an interactive operation performed therewith.
Figure 35B:
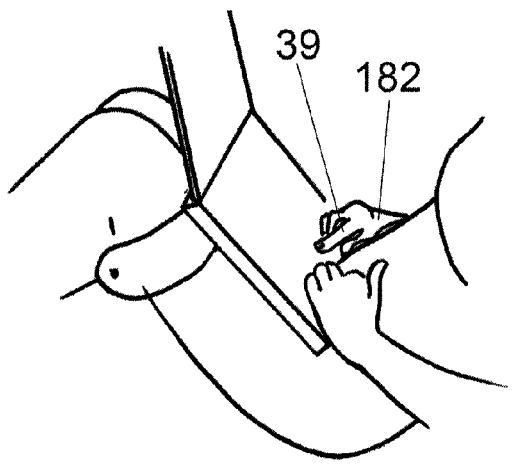
Figure 35C:
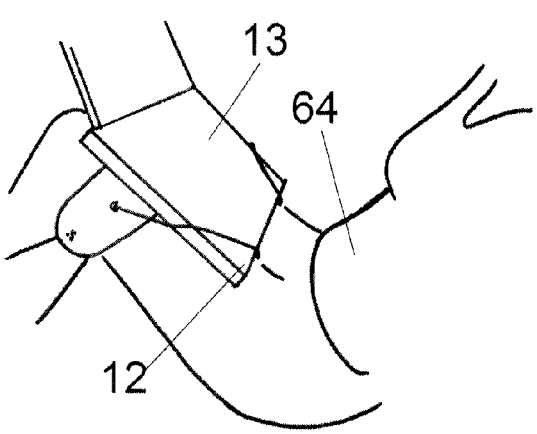
Figure 35D:
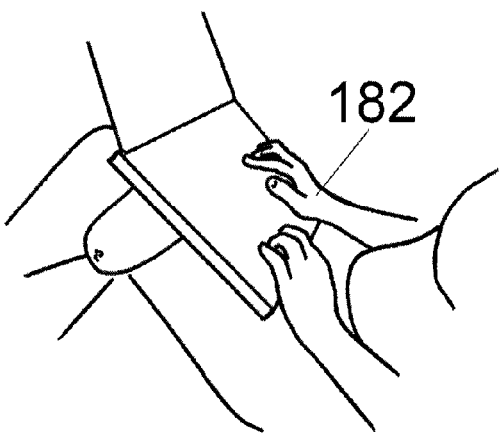

As explained hereinabove, adjusting device 177 (FIG. 31) is used to adjust the spacing S of a laptop engageable cord portion 179 from the abdomen facing edge 172 of thigh engageable member 161. When spacing S is increased, as shown in FIG. 35A, the abdomen facing corners 12 of portable computer 13 engaged by a corresponding cord portion 179 are consequently caused to be lowered along the inclined thighs 17 in a direction towards the groin 21 until contacting, or slightly spaced from, the abdomen 64 of the subject. At such a position of portable computer 13, depressing buttons of the keyboard by fingers 39 is uncomfortable and tiring since, as shown in FIG. 35B, the thenar region 182 of the palm is not supported by the base portion of portable computer 13, thereby increasing static stress on the hand, arm, and shoulder muscles. However when spacing S is decreased as shown in FIG. 35C, abdomen facing corners 12 of portable computer 13 are significantly spaced from abdomen 64, thereby allowing the thenar region 182 of the palm to be supported by the base portion of portable computer 13, as shown in FIG. 35D, and leading to a considerably more comfortable interactive operation.

Figure 36:
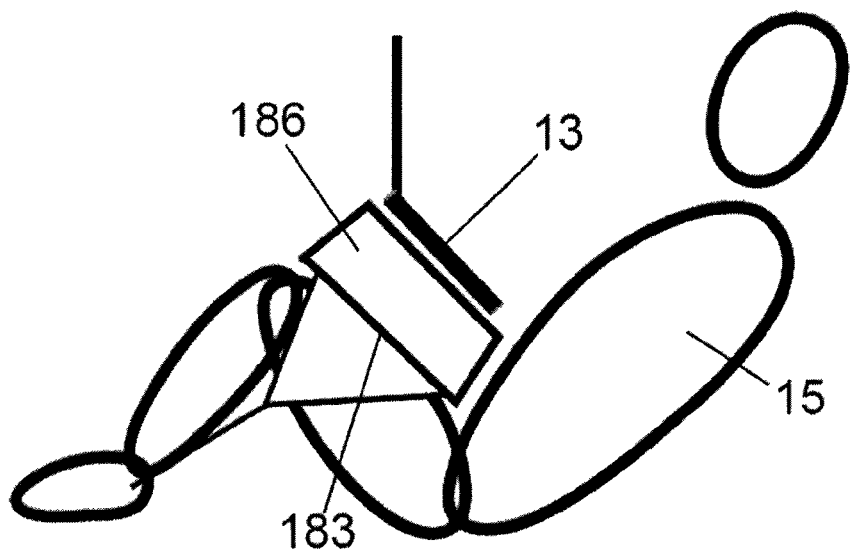
FIG. 36 is a side view of a support member for supporting a portable computer.

With reference to FIG. 36, a support member 186 for supporting portable computer 13 may be placed on, or attached to, thigh engageable member 183. Support member 186 may be adapted to position portable computer 13 at a desired angle or at a desired distance from the eyes of subject 15, for reduced eye or muscular fatigue. The support member may also provide other benefits to a subject interfacing with portable computer 13. The support member may be configured with shielding means, such as padding, for shielding the subject from the heat and radiation that a portable computer emits. Support member 186 may also have a cavity for storing articles of importance or a stand for hanging documents needed for reference purposes during a computer interfacing operation. Peripheral electronic components that can be coupled to portable computer 13, such as a fan or a speaker may be housed within support member 186.

It will be appreciated that peripheral electronic components that can be coupled to portable computer 13, such as a fan or a speaker, can be provided to any other embodiment of a stabilizing apparatus described herein.

Figure 37:
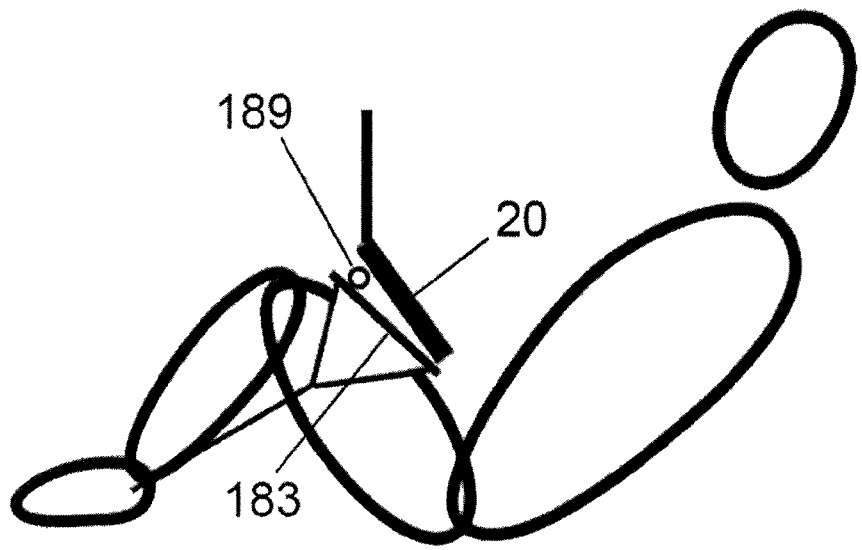
FIG. 37 is a side view of a spacer attached to a thigh engageable member, for raising the foot facing end of a portable computer base portion.

In FIG. 37, a spacer 189 is attached to thigh engageable member 183, in order to raise the foot facing end of portable computer base portion 20, thereby reducing eye fatigue and providing ventilation below base portion 20. Thigh engageable member 183 may be completely rigid, partially rigid, completely flexible, or partially flexible.

Figure 38:
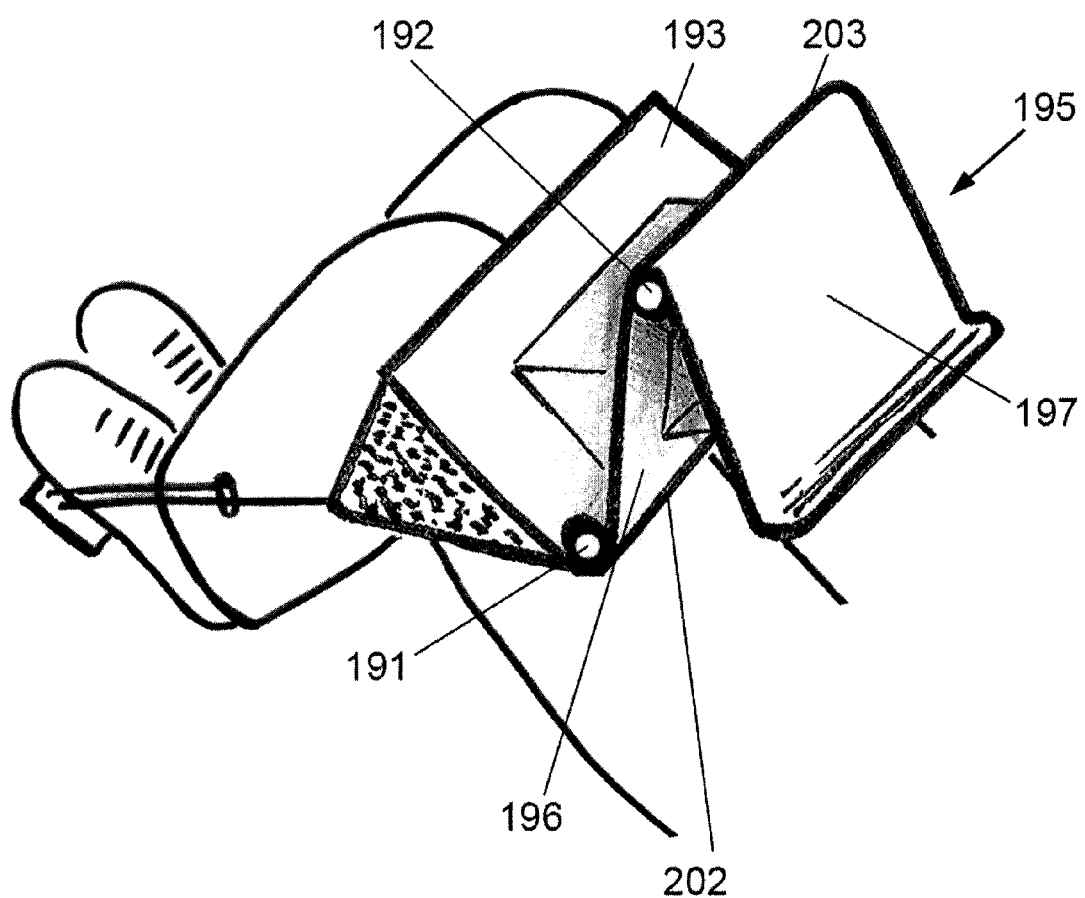
FIG. 38 is a perspective view from the top of a device for changing the orientation and distance from the subject's eyes of a portable computer.

Another device for changing the orientation of a portable computer or the distance of a portable computer screen from the eyes is shown in FIG. 38. Device 195 comprises one or more pivotable rectangular plates 196 and 197, each of which has approximately the same surface area as thigh engageable member 193. A hinge portion 191, e.g. a fabric portion or a pin, transversally extends, and is rotatably attached to, substantially the entire length of thigh engageable member 193 at the abdomen facing edge thereof. One transversally extending edge 202 of plate 196 is attached to hinge portion 191, and a hinge portion 192 transversally extends, and is rotatably attached to, substantially the entire length of the second transversally extending edge 203 of plate 196. To hinge portion 192 is attached one transversally extending edge of plate 197. The base portion of a portable computer is securable to plate 197. The viewing angle of the portable computer screen or the distance therefrom to the eyes can therefore be optimized by pivoting each of plates 196 and 197 to a desired angle.

Other types of interactable units may be securable to a specially adapted thigh engageable member.

Stabilizing apparatus 210 illustrated in FIG. 39 comprises a thigh engageable member 215 that allows a subject 15 to interact with an infant placed on the lap for an extended period of time. Thigh engageable member 215 is provided with one or two side cushioned restraints 221, e.g. having an arcuate shape, vertically protruding from thigh engageable member 215. The width of thigh engageable member 215 is approximately equal to that of the lap. Thigh engageable member 215 may comprise a relatively rigid layer, e.g. made of wood or plastic, which is sandwiched between two cushioned layers made of foam, rubber or any other material for added comfort to the subject and to the infant. Due to the added strength of the relatively rigid layer of thigh engageable member 215, a harness 226 may be connected to thigh engageable member 215 by any means well known to those skilled in the art as an added precaution to prevent the infant from falling. An appendage 216 for restraining leg movement is attached to thigh engageable member 215 and extends downwardly therefrom.

Substantial longitudinal, i.e. in the direction between the abdomen and knees of subject 15, and transversal movement of thigh engageable member 215, are restricted by the forces applied by the connecting element connected to a corresponding appendage 216. As it is stabilized, thigh engageable member 215 will be assured of remaining on top of the lap of subject 15 despite different movements of the infant. An infant placed on top of thigh engageable member 215 will therefore be assured on not falling from the lap.

An infant 235 is shown in FIG. 40 to be positioned on top of thigh engageable member and restrained by harness 226 while facing subject 15.

Figure 41:
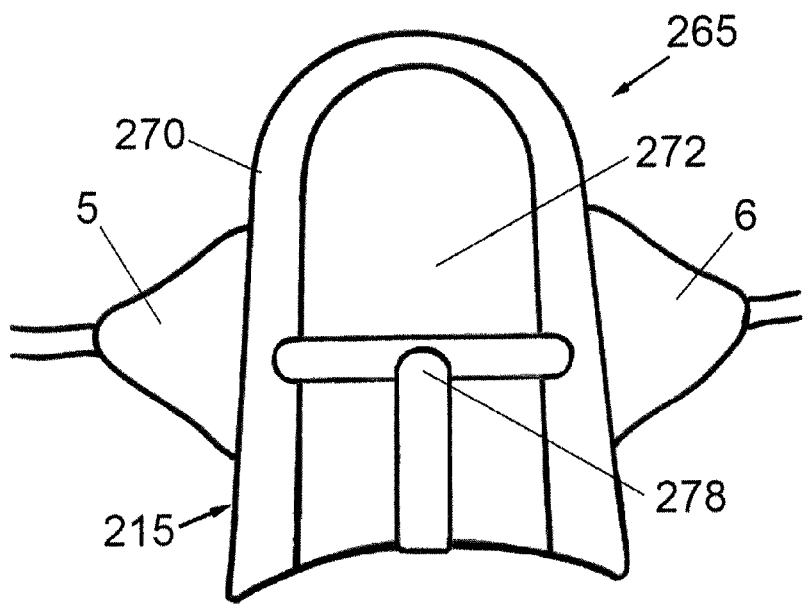
FIG. 41 is a top view of another embodiment of a thigh engageable member.

FIG. 41 illustrates a top view of another embodiment of a thigh engageable member 265 for interacting with an infant placed on the lap for an extended period of time. Thigh engageable member 265 comprises a rigid frame 270, which may have an arcuate configuration and be connected to triangular appendages 5 and 6, a padded peripheral element 268 attached to a lower face of frame 270, and a central region 272 delimited by frame 270 and made of a stretchable fabric in which an infant is placeable and supported. One or two cushioned restraints 278 may be attached to frame 270.

Figure 42:
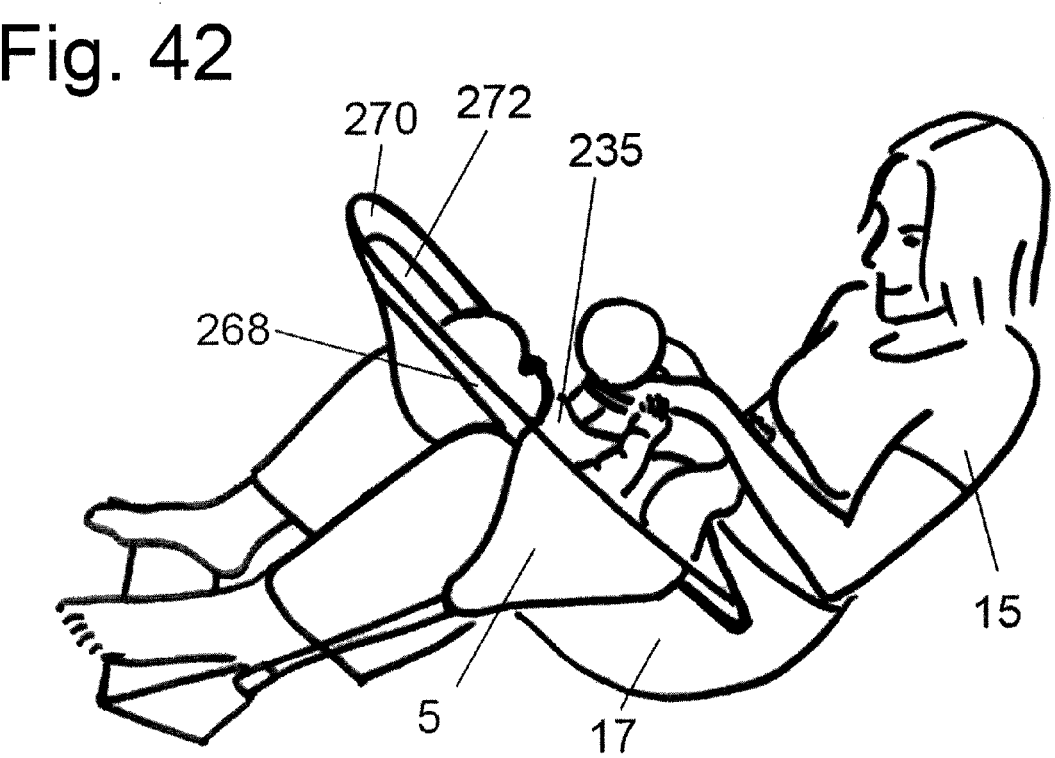
FIG. 42 is a perspective view from the side of the thigh engageable member of FIG. 41 when an infant is positioned therewithin.

FIG. 42 illustrates a perspective view of thigh engageable member 265 when an infant 235 is positioned therewithin. Rigid frame 270 is shown to be positioned while padded peripheral element 268 is resting on thighs 17 of subject 15, e.g. the mother, while the head of infant 235 stably sinks within the stretchable fabric of central region 272 between the thighs 17.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. Stabilizing apparatus for inclined legs of a subject in a supine or reclined position, comprising:
   a) a single thigh engageable portion extending generally transversally along the width of the lap of a subject with which said apparatus is bodily engaged;
   b) two spaced appendage portions extending downwardly from a corresponding transversal end and a longitudinal central region of said thigh engageable portion, wherein each of said two appendage portions is positionable to be in contact with, or slightly spaced from, the lateral side of a thigh of said subject;
   c) a single foot engageable portion positionable on an underlying surface;
   d) two spaced elongated and flexible connecting elements having an unchangeable length, each of which connected by a first end thereof to a central region of one of said two appendage portions and fed through a corresponding aperture of said foot engageable portion and being spaced apart from the other connecting element between said one appendage portion and said foot engageable portion; and
   e) a tensioning device having a first opening through which one of said connecting elements is introducible and slidable and a second opening to which a second end of said one connecting element is secured, defining a first portion of said one connecting element extending from said one appendage portion to said foot engageable portion and a second portion of said one connecting element extending from said foot engageable portion to said tensioning device, said tensioning device operable for adjustment of a relative length of each of said first and second connecting element portions upon application of a tensioning or loosening force in a direction substantially along the length of said one connecting element whereby to controllably adjust the tension of the appendage portion,
   wherein said thigh engageable portion, said foot engageable portion, said two appendage portions, and each of said connecting elements define together only one closed loop which is suitably tensioned, following application of said tensioning force, to cause said two appendage portions to engage either side of the subject's lap to prevent relative transversal motion of inclined legs and said two connecting elements to resist a forward foot sliding motion of said inclined legs when said subject is in a supine or reclined position.

2. The apparatus according to claim 1, wherein the thigh engageable portion comprises—
   one or more interface elements for stably engaging an interactable object:
   two rigid boards that are pivotally connected together and covered by fabric, the thigh engageable portion when partially opened serving as a case for the introduction within its interior of one or more components of the apparatus and said two covered boards being retainable in a closed position by means of a fastening device; or
   a rigid frame supportable on the thighs of the subject, a padded peripheral element attached to a lower face of said frame, and a central region delimited by said rigid frame and made of a stretchable fabric in which an infant is placeable and stably supported.

3. The apparatus according to claim 1, wherein the tensioning device comprises a fixating element selectively engageable with, and localized at, a connecting portion of the connecting elements for preventing additional displacement of the connecting portion after the length of the connecting portion has been set.

4. Stabilizing apparatus for inclined legs of a subject in a supine or reclined position, comprising:
   a) a single thigh engageable portion extending generally transversally along the width of the lap of a subject with which said apparatus is bodily engaged;
   b) two spaced flexible and tensionable appendage portions extending downwardly from a corresponding transversal end and a longitudinal central region of said thigh engageable portion;
   c) a single foot engageable portion positionable on an underlying surface; and
   d) two spaced elongated portions having an unchangeable length, each of which extending from a corresponding one of said two appendage portions to said foot engageable portion and being spaced apart from the other elongated portion between said corresponding appendage portion and said foot engageable portion,
   wherein each of said two appendage portions is positionable to be in contact with, or slightly spaced from, the lateral side of a thigh of said subject,
   wherein said thigh engageable portion, said single foot engageable portion, said two appendage portions, and each of said elongated portions form together only a single closed loop,
   wherein each of said elongated portions extends from a central region of a corresponding appendage portion and is suitably tensioned to resist a forward foot sliding motion and to cause said two appendage portions to engage the lateral side of a corresponding thigh of said subject to resist relative transversal motion of an inclined leg, when said subject is in a supine or reclined position.

5. The apparatus according to claim 4, wherein both feet of the subject are engageable by the foot engageable portion.

6. The apparatus according to claim 5, wherein the foot engageable portion is a foot engageable member which is provided with two apertures through each of which a corresponding connecting element is feedable.

7. The apparatus according to claim 4, wherein the thigh engageable portion is a thigh engageable member that is attached at its two transversal ends to two appendages, respectively.

8. The apparatus according to claim 7, wherein the two appendages are triangular, one end of the connecting element being attached to an apical portion of a corresponding triangular appendage which is not attached to the thigh engageable member.

9. The apparatus according to claim 7, wherein the two appendages are releasably attached to the thigh engageable member.

10. The apparatus according to claim 9, wherein the appendage is a strip comprising at one end thereof a hook element, said hook element being releasably engageable with an attachment element having an elongated and narrow cavity which is fastened to a corresponding appendage facing region of the thigh engageable member.

11. The apparatus according to claim 4, wherein the thigh engageable portion comprises one or more interface elements for stably engaging an interactable object.

12. The apparatus according to claim 11, wherein the interactable object is a portable computer or an infant carrier.

13. The apparatus according to claim 12, further comprising a device contacting the one or more interface elements or the portable computer, for changing the orientation of the portable computer or the distance of a portable computer screen from the eyes of the subject.

14. The apparatus according to claim 12, wherein each of the one or more interface elements is—
    an angled element attached to the thigh engageable portion for engaging a corresponding corner of the portable computer;
    a loop defined by a cord fed through two apertures formed in the thigh engageable portion and secured, for engaging a corresponding corner of the portable computer;
    one of two intersecting interface elements;
    a side restraint; or
    a harness.

15. The apparatus according to claim 14, further comprising an adjusting device through which the cord fed through the two apertures is additionally fed, for adjusting the relative position of a portable computer engaged by two or more loops with respect to an abdomen facing edge of the thigh engageable portion.

16. The apparatus according to claim 4, wherein the foot engageable member is a rigid board.

17. The apparatus according to claim 4, wherein the thigh engageable portion comprises an integral case.

18. The apparatus according to claim 4, wherein the foot engageable portion is a foot receivable cavity or a cord for engaging both feet of the subject.

19. The apparatus according to claim 18, wherein the foot receivable cavity is a foot warmer or an open-backed clog.

20. The apparatus according to claim 4, wherein the thigh engageable portion is restable on at least one-quarter the length of the thighs of said subject for preventing both a forward foot sliding motion and a relative transversal motion of an inclined leg.

21. The apparatus according to claim 4, wherein the appendage portion is integrally formed with the thigh engageable portion so as to be independent of any attachment element therebetween, or the elongated portion having an unchangeable length is integrally formed with the foot engageable portion so as to be independent of any attachment element therebetween.

22. The apparatus according to claim 21, wherein the appendage portion is integrally formed with the thigh engageable portion so as to be independent of any attachment element therebetween, and the elongated portion having an unchangeable length is integrally formed with the foot engageable portion so as to be independent of any attachment element therebetween.

23. The apparatus according to claim 13, wherein each of the appendage portions is wider than a corresponding elongated portion extending from an appendage portion to a foot engageable portion.

24. The apparatus according to claim 13, further comprising a tensioning device mounted on, and localized at, one or both of said two elongated portions, whereby to controllably adjust the tension of the appendage portion,
    wherein said tensioning device is in cooperation with said single closed loop so as to apply forces to both said single foot engageable portion for resisting a forward foot sliding motion and to said corresponding appendage portion to engage the lateral side of a corresponding thigh of said subject for resisting relative transversal motion of an inclined leg when said subject is in a supine or reclined position.

25. The apparatus according to claim 24, wherein the tensioning device is operable to change the tension of the elongated portion on which it is mounted while the single closed loop is in body engagement with the subject.

26. Method for supporting legs of a user of stabilizing apparatus when they are bent at the knee and the user is in a supine or reclined position, the stabilizing apparatus configured as only a single closed loop having:
    i. a single thigh engageable portion;
    ii. two flexible and tensionable appendage portions extending from a region of a corresponding longitudinal end of said thigh engageable portion in such a way so as to be positioned symmetrically with respect to a transversally extending centerline of said thigh engageable portion;
    iii. a foot engageable portion;
    iv. an elongated portion having an unchangeable length and extending from each of said two appendage portions to said foot engageable portion; and
    v. a tensioning device mounted on one or both of said elongated portions, defining a first portion of said one or both of said elongated portions extending from each of said two appendage portions to said foot engageable portion and a second portion of said one or both of said elongated portions extending from said foot engageable portion to said tensioning device, for adjusting a relative length of each of said first and second elongated portions,
the method comprising the steps of:
    a) setting said single closed loop in body engagement with the user by performing the two operations exclusively of (1) positioning said thigh engageable portion on top of a central region of the thighs of a subject in such a way so as to extend generally transversally along the width of the lap, while said two spaced appendage portions extend downwardly from a corresponding transversal end and a longitudinal central region of said thigh engageable portion so as to be in contact with, or slightly spaced from, the lateral side of a thigh of said subject, and (2) positioning said foot engageable portion under the feet of the user and in contact with an underlying surface; and b) adjusting said tensioning device to tension said two appendage portions and said one or both of said elongated portions such that said two appendage portions protrude from said corresponding longitudinal ends of said thigh engageable portion and engage either side of the user's lap to prevent relative transversal motion of the legs and that each of said elongated portions prevents the user's legs from being straightened so that they remain bent at the knee.

27. The method according to claim 26, wherein the legs of the subject are set to an inclined position corresponding to an angle ranging from 15 to 40 degrees between the underlying surface and each of the elongated portions extending from an appendage portion to a foot engageable portion.

* * * * *

UNITED STATES PATENT AND TRADEMARK OFFICE
CERTIFICATE OF CORRECTION

PATENT NO. : 9,538,852 B2  
APPLICATION NO. : 14/110037  
DATED : January 10, 2017  
INVENTOR(S) : Levy et al.

Page 1 of 1

It is certified that error appears in the above-identified patent and that said Letters Patent is hereby corrected as shown below:

In the Claims

Column 18,  
Lines 13 and 17, "according to claim 13" should read --according to claim 4--.

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*